United States Patent
Jacobowitz et al.

[11] Patent Number: 6,118,740
[45] Date of Patent: Sep. 12, 2000

[54] SYSTEM FOR CREATING, READING AND WRITING ON ROTATABLE INFORMATION STORAGE MEDIA, A METHOD FOR WRITING CLOSELY SPACED INFORMATION TRACKS

[75] Inventors: Lawrence Jacobowitz, Wappingers Falls; Casimer M. DeCusatis, Poughkeepsie, both of N.Y.

[73] Assignee: International Business Machines Corporation, Armonk, N.Y.

[21] Appl. No.: 09/023,972

[22] Filed: Feb. 13, 1998

[51] Int. Cl.[7] .................................................. G11B 7/09
[52] U.S. Cl. ................................. 369/44.38; 369/44.13
[58] Field of Search ............................ 369/44.37, 44.38, 369/44.13, 100, 110, 94

[56] References Cited

U.S. PATENT DOCUMENTS

| | | |
|---|---|---|
| 3,430,966 | 3/1969 | Gregg . |
| 3,848,095 | 11/1974 | Wohlmut et al. . |
| 3,946,367 | 3/1976 | Wohlmut et al. . |
| 4,021,714 | 5/1977 | Jones et al. . |
| 4,074,312 | 2/1978 | van Rosmalen . |
| 4,090,031 | 5/1978 | Russell . |
| 4,100,577 | 7/1978 | Naruse et al. . |
| 4,115,808 | 9/1978 | Miyaoka . |
| 4,164,754 | 8/1979 | Dubois . |
| 4,190,775 | 2/1980 | Sakurai et al. . |
| 4,241,423 | 12/1980 | Burke et al. . |
| 4,271,334 | 6/1981 | Yardy . |
| 4,301,445 | 11/1981 | Robinson . |
| 4,337,531 | 6/1982 | Willemsen . |
| 4,352,981 | 10/1982 | Sugiyama et al. . |
| 4,358,774 | 11/1982 | Wilkinson . |
| 4,397,010 | 8/1983 | Nabeshima . |
| 4,445,209 | 4/1984 | Mickleson et al. . |
| 4,449,138 | 5/1984 | Ando . |
| 4,450,553 | 5/1984 | Holster et al. . |
| 4,460,977 | 7/1984 | Shimada et al. . |
| 4,475,179 | 10/1984 | Geyer . |
| 4,481,550 | 11/1984 | Miller et al. . |
| 4,507,763 | 3/1985 | Kato ...................................... 369/44.38 |
| 4,531,206 | 7/1985 | Kimura . |
| 4,621,351 | 11/1986 | Baer et al. . |
| 4,700,336 | 10/1987 | Yoshida et al. . |
| 4,760,565 | 7/1988 | Jipson et al. ........................... 369/44.38 |
| 4,951,273 | 8/1990 | Yoshida et al. . |
| 4,953,151 | 8/1990 | Imanaka . |
| 4,972,397 | 11/1990 | Zurbrick et al. . |
| 5,016,233 | 5/1991 | Morimoto et al. . |
| 5,022,021 | 6/1991 | Ito . |
| 5,029,023 | 7/1991 | Bearden et al. . |
| 5,031,165 | 7/1991 | Fujita .................................... 369/44.13 |
| 5,070,496 | 12/1991 | Ogawa et al. . |
| 5,077,719 | 12/1991 | Yanagi et al. . |
| 5,138,529 | 8/1992 | Colton et al. . |
| 5,138,604 | 8/1992 | Umeda et al. . |

(List continued on next page.)

FOREIGN PATENT DOCUMENTS

| | | |
|---|---|---|
| 0146109 | 6/1985 | European Pat. Off. . |
| 2-690-542 | 10/1993 | France . |
| 61-9848 | 1/1986 | Japan . |
| 61-246936 | 11/1986 | Japan . |
| 1-178145 | 7/1989 | Japan . |
| 5-182203 | 7/1993 | Japan . |
| 5-234145 | 9/1993 | Japan . |
| 8-321067 | 12/1996 | Japan . |

*Primary Examiner*—Thang V. Tran
*Attorney, Agent, or Firm*—Lawrence D. Cutter

[57] ABSTRACT

A method for writing information on a laser writable recording blank with reference tracks utilizes a split laser beam. A first of these beams is used for writing while the second is directed to a mirror or similar device which causes the second beam to move across a track edge in an oscillatory manner. The laser light reflected in this process is converted to an electrical signal which is analyzed to determine very precisely the distance between the track edge and the point of impingement of the first beam on the disk. Power in this first beam is then controlled so as to write information on the disk. The precise control allows a plurality of information tracks to be written between adjacent reference track portions.

6 Claims, 22 Drawing Sheets

U.S. PATENT DOCUMENTS

| | | |
|---|---|---|
| 5,161,040 | 11/1992 | Yokoyama et al. . |
| 5,231,280 | 7/1993 | Imakawa . |
| 5,251,198 | 10/1993 | Strickler . |
| 5,386,409 | 1/1995 | Yokota et al. . |
| 5,408,453 | 4/1995 | Holtslag et al. . |
| 5,436,880 | 7/1995 | Eastman et al. . |
| 5,473,587 | 12/1995 | Hamaguchi et al. . |
| 5,495,466 | 2/1996 | Dohmeier et al. . |
| 5,506,826 | 4/1996 | Kobayashi . |
| 5,511,059 | 4/1996 | Brazas, Jr. . |
| 5,521,895 | 5/1996 | Miura et al. . |
| 5,617,400 | 4/1997 | Fuji . |
| 5,623,466 | 4/1997 | Itonaga . |
| 5,638,350 | 6/1997 | Fuji . |
| 5,663,939 | 9/1997 | Kase . |
| 5,671,099 | 9/1997 | Ishii et al. . |
| 5,677,903 | 10/1997 | Holtslag et al. ............................ 369/94 |
| 5,684,782 | 11/1997 | Jacobowitz et al. . |
| 5,708,652 | 1/1998 | Ohki et al. . |
| 5,715,157 | 2/1998 | Kuhn . |
| 5,715,218 | 2/1998 | Ikeda . |
| 5,740,145 | 4/1998 | Jacobowitz et al. . |
| 5,754,513 | 5/1998 | Yagi et al. . |
| 5,757,743 | 5/1998 | DeCusatis et al. . |
| 5,764,603 | 6/1998 | Glaser-Imbari . |
| 5,768,221 | 6/1998 | Kasami et al. ............................ 369/94 |
| 5,777,961 | 7/1998 | Matsui . |
| 5,828,639 | 10/1998 | Kobayashi et al. . |
| 5,844,871 | 12/1998 | Maezawa . |
| 5,854,781 | 12/1998 | Kurihara . |
| 5,872,723 | 2/1999 | DeCusatis et al. . |
| 5,892,739 | 4/1999 | DeCusatis et al. . |
| 5,903,537 | 5/1999 | Gage et al. . |

SYSTEM FOR CREATING, READING AND WRITING ON ROTATABLE INFORMATION STORAGE MEDIA, A METHOD FOR WRITING CLOSELY SPACED INFORMATION TRACKS

BACKGROUND OF THE INVENTION

The present invention is generally directed to the manufacture and utilization of information storing systems employing rotatable storage devices which contain a reference track which renders it possible to perform multiple storage and retrieval functions including the identification of individual bit locations on a recordable disk. More particularly, the present invention is directed to a method for writing information on the disk. Even more particularly, the present invention is directed to a method for writing a plurality of closely spaced information tracks between adjacent reference tracks on a rotatable medium.

A central aspect of the present invention involves the recognition of a frequency doubling phenomenon that occurs when a light source having an essentially gaussian intensity distribution is dithered across a surface exhibiting a sharp reflectivity discontinuity (or other optical property discontinuity). The present invention exploits frequency doubling and phase reversal as mechanisms for accurately positioning a laser light source which is used to write information onto a recordable, rotatable blank in systems which can be made to be compatible with existing CD-ROM devices which unfortunately only perform read functions. While there do exist apparatus for performing disk-writing operations, these systems are expensive and cannot provide the information density which is rendered possible by the use of a servo tracking system of the kind described herein.

Clearly, the commercial craving for increased information density on recordable media has been a significant driving force in present day information-handling systems technology development. Moreover, commercial and market forces have increased the demand for a significant increase in the raw amount of data needed to be stored and accessed upon a removable device. These forces have also increased the demand that this information be available quickly and accurately. Moreover, there has been an increase in the desire to make the information on these disks writable by end users.

Other related developments in this technology have included the design and construction of units that are capable of writing information to several overlying layers in a single compact rotatable disk device. Furthermore, the desire to store graphic and moving picture images and sound on these devices has also produced variants of the now ubiquitous computer and audio CD-ROM devices and the market has now branched out into the production of DVD (digital video disk) platters. Accordingly, it is an object of the present invention to provide solutions to problems which occur in this emerging technology.

The present invention provides and is an overall solution to the problems and challenges produced by digital information storage technologies. The present invention provides a comprehensive and detailed solution to many of the problems existing in this industry. It is seen in the present invention that the inventors have started from a technology base related to servo positioning and have extended that capability and have utilized it to provide an extensive and comprehensive solution to all of the above-described problems of data storage, transmission speed and data accuracy. A complete end-to-end solution of the problems described is provided herein. It is therefore seen that the present inventive system begins with the production of information storage blanks which are employed in applicants' inventive system. Associated with these blanks, there is also included an apparatus for reading and writing to these disks. An additional beneficial mechanism that falls out from this work is a system for immediately performing read-after-write operations. This is possible since the signals produced by the servo tracking mechanism of the present invention are particularly useful for exceedingly accurate position control. Additionally, deliberate dithering and its signal consequences are employed to control focus for reading and writing multi-layer disks. Further improvements also result from the fact that laser beam splitting is employed to write information to both sides of a disk using simple and relatively inexpensive beam splitting devices. In all of these variations, applicants have been able to exploit the signals that are produced using specifically designed detector circuits for performing a variety of different functions. In particular, the notions and problems associated with error correction take on an entirely new meaning and perspective when performed within the context of the system claimed herein.

The detailed description below includes a complete characterization of all aspects of making and using the specific system or method claimed herein. Various aspects of this description can, however, be found as being described under the following general topics; accordingly, the detailed description is divided into several sections in which the following specific aspects are discussed: (I) Recording Blanks; (II) Basic Writing Operations; (III) Signal Detection; (IV) Reading after Writing; (V) Error Handling; (VI) Multi-layer Processing; and (VII) Read/Write Head Design.

To fully understand the advantages provided by the present invention, one should appreciate the problems presently found in CD-ROM writing technology. A significant problem in this area is the fact that the disks for writing are not inexpensive. Furthermore, a fundamental problem in writing to CD-ROM-like devices using a laser is that there is a definite need for data formatting. In present day CD-ROM writing technologies, all of the data medium looks the same. There are no reference points per se. Efforts at resolving this problem by providing molded grooves in a disk as a starting point are disadvantageous in that they are large and consume a significant amount of space on the disk. Other approaches which attempt to solve this problem employ master disks. These disks, however, require expensive mastering systems and the tracks are still too large or at least larger than needed. Therefore, it is seen that a significant need in the CD-ROM writing technology is a mechanism for providing inexpensive writable media.

Other problems in this area are also presented. In particular, it is known that there are, in fact, different data formats employed. For example, one data format may be employed for an audio CD-ROM, another format may be employed for a CD-ROM which stores computer program and data. Yet another data format may be employed for the storage of real-time video presentations such as is seen in the recently announced DVD technology (DVD stands variously either for Digital Video Disk or Digital Video Data).

Furthermore, in the midst of the technology explosion related to CD-ROM type devices, various implementations of multi-layer disks are being proposed.

Yet another problem with any advanced CD-ROM writing technology is the question of whether or not it is compatible with already existing CD-ROM reading technology.

Furthermore, still further questions arise with respect to whether or not future technologies such as is provided by the present invention are compatible with systems such as magneto optical (MO) recording techniques. Fortunately, the system provided by the present invention is compatible with many existing technologies and provides break through approach in which ultimately each bit on a CD-ROM is addressable and locatable. As a consequence, the problems associated with disk formatting disappear. Effectively, such problems are relegated to software, leaving the hardware free to easily express information in a variety of formats.

SUMMARY OF THE INVENTION

The fundamental principle behind the present invention is the utilization of optical dithering employed in conjunction with the provision of sharply different optical disk regions. These optically different regions form the basis of providing a trackable servo spiral (or concentric) track whose edges define paths for control of laser reading and writing. Furthermore, in situations in which multi-layered disks are employed, dithering across an edge of the track is supplemented with dithering in the z-direction (towards and away from the disk). Dithering in z-direction simultaneously provides the ability to select the layer of the disk into which information is written and from which information is read. In this regard, it is particularly noted that, not only is this layer selection rendered possible, but controlled focus into the desired layer is also provided via the same optical dithering principles used for servo tracking in the radial or redirection.

The optical dithering principles employed in the present invention are significant because they result in a method for tracking both for writing and reading purposes in which it is possible to determine not only that one is "on track," but also that one can determine exactly how far off one is with respect to an edge of an embedded servo track. This is to be contrasted with other systems in which only off-track error indications are provided. The present system provides continuous positive feedback control which precisely determines and controls the location of a laser spot either for writing or for reading purposes. It is this precision which permits multiple information tracks to be read from and written into the recordable medium which lies between embedded servo tracks.

The position precision plus the phase of the output associated with dithering on one side or another of a servo track side permits track counting and, therefore, provides an accurate determination of the radial position of any point on the recordable medium. This fact coupled and used in conjunction with one or more registration marks precisely determine the position of a bit in the angular or θ direction, θ being a polar coordinate position angle.

A number of advantages flow from this capability including the capability of providing the system with drive system diagnostics and monitoring together with the monitoring of the performance of the laser light source employed. Furthermore, the precision that results from the use of the present invention permits errors to be corrected in ways that were not heretofore possible with other systems. This is particularly true when the principles of the present invention are employed in constructing read-after-write configurations. And again, these configurations are rendered possible because of the specific nature of the tracking mechanisms provided herein. It is furthermore noted that the ability to know precisely where information is on a recordable CD-ROM-like medium means that the disk may be indexed much like a random access or magnetic disk memory. This means that information on disks used and manufactured in accordance with the present invention may be found rapidly and stored densely and efficiently.

Accordingly, it is an object of the present invention to provide a comprehensive system for writing information on inexpensive rotatable media similar to current CD-ROM technology.

It is also an object of the present invention to provide a method for producing blank recording disks which contain embedded servo tracks for precise control of information positioning both for reading and for writing operations.

It is yet another object of the present invention to provide an apparatus for writing information in multiple information tracks between embedded servo tracks.

It is a still further object of the present invention to provide apparatus and method for reading and writing information at high density and with high information transmission rates.

It is also an object of the present invention to provide a method and system for precisely locating individual information bits or sets of bits on a rotatable recording medium.

It is yet another object of the present invention to provide servo and feedback control mechanisms which are capable of compensating for system variations such as disk flatness, bearing tolerances and motor speed.

It is also an object of the present invention to provide an apparatus and method in which information which is written onto a rotating CD-ROM-like medium may be immediately read therefrom so as to be able to determine its accuracy and to immediately apply error correction or error compensation.

It is a still further object of the present invention to provide a servo feedback tracking apparatus which is capable of reading and writing information from a plurality of layers on a rotating CD-ROM-like medium.

It is a still further object of the present invention to provide an apparatus for multi-layer writing and for multi-layer reading of rotatable information disks.

It is a still further object of the present invention to provide a mechanism which is capable of determining variations in rotation speed, particularly those variations associated with end of motor life.

It is a still further object of the present invention to provide a method and system for determining whether or not a laser semiconductor light source is at or near its end of life point.

It is also an object of the present invention to employ reading-after-writing capabilities using laser power modulation.

It is a still further object of the present invention to provide a system for writing to and reading from a plurality of layers on a single disk.

It is also an object of the present invention to provide a read/write head which is particularly suitable for use with multi-layer tracked systems in which different layers are employed on opposite sides of the same disk.

It is a further object of the present invention to provide a system for precisely tracking the position of a laser beam so that information may be written to and read from a rotatable disk in a reliable, dense, closely packed fashion with a low access time and with a high transmission rate.

It is a object of the present invention to provide a writable information storage system using a rotatable medium which is compatible with a variety of different data formats.

It is a still further object of the present invention to provide an information storage medium in which the information is stored in a volume as opposed to merely storing information in a single plane.

It is also an object of the present invention to provide a blank recording disk which includes either one or a plurality of layers for writing and reading operations.

It is yet another object of the present invention to provide a writable blank information medium containing a plurality of servo tracks for precise positioning of information storage bits on opposite sides of a rotatable disk.

It is yet another object of the present invention to take advantage of frequency doubling and phase characteristics of reflected tracking signals which result from a beam of light being dithered across an edge of optically different materials.

It is a still further object of the present invention to provide an area on an information disk which includes information describing locations which are in error.

It is yet another object of the present invention to provide nearly simultaneous writing and read-back capabilities.

It is a still further object of the present invention to provide signal processing circuitry for determining laser beam position and also for determining a layer in a rotatable recording medium which is being employed for reading or writing operations.

It is a still further object of the present invention to provide an inexpensive recording medium which is particularly useful in write-once applications.

It is an object of the present invention to provide a system and method for continuous spiral track edge following.

It is also an object of the present invention to create a three-dimensional bit map of information on a recording medium so as to improve access time.

It is yet another object of the present invention to integrate error detection capabilities in an information storage system involving rotation and precision bit mapping of storage locations.

It is also an object of the present invention to provide simultaneous servo tracking of laser focus within a given layer of a multi-layer disk together with servo tracking along an edge.

It is also an object of the present invention to be able to provide improved measurement for rotation speed of recordable disk media.

It is yet another object of the present invention to be able to create a recorded disk information storage medium having indications thereon of actual recording parameters such as physical speed, spacing, format and angular velocity.

It is a further object of the present invention to more accurately determine angular rotation velocity by more accurately determining radial position.

It is a still further object of the present invention to be able to store rotational velocity information over time so as to provide an assessment of drive motor functioning particularly with respect to aging and/or end-of-life predictions and warnings.

Lastly, but not limited hereto, it is an object of the present invention to provide systems, methods and apparatus for economical writing of information on a rotatable disk using laser writing and position control.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

In a prior filed application, Ser. No. 08/626,302, filed Apr. 1, 1996, and issued on Nov. 4, 1997, as Pat. No. 5,684,782 which is hereby incorporated herein by reference, the generation and utilization of the signal S×I was demonstrated. In particular, the inventors therein discerned that if a laser light source is dithered back and forth across an optical boundary exhibiting different optical properties, such as reflectivity, it is possible to employ the information present in the modulated returning light to determine and thus to control laser position. In the present application, the inventors therein extend their prior work to cover situations in which writing information to a laser disk is a primary objective. In particular, the applicants herein describe a writing system based upon signal processing techniques demonstrated in several related prior patent applications submitted by the same inventors as herein.

Figure 1:
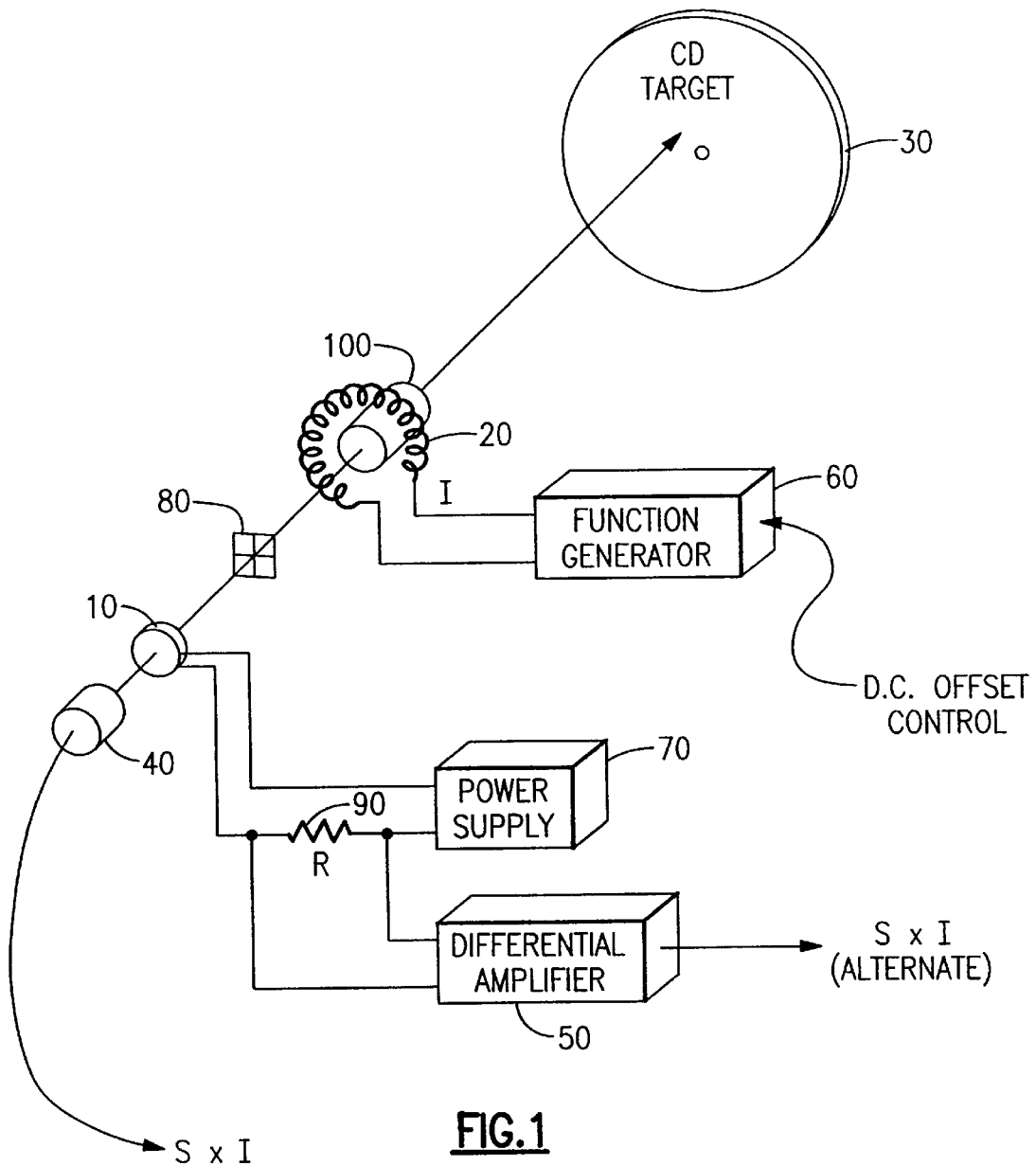
FIG. 1 is an is a partially isometric functional block diagram illustrating the basic components and operating principles behind dithering of laser light with respect to a compact-like parts.

For a more complete understanding of the present invention, attention is directed to FIG. 1 wherein there is shown, in schematic diagram form, an arrangement which may be employed to illustrate the operation of the present invention. In particular, in FIG. 1, there is shown diode injection laser 10 which directs laser light through preferred crossed fiber 80 which corrects for unequal divergence of the laser light into lens 100. Crossed filters 80 serve to circularize the laser light so that the divergence in both directions is equal. The physical positioning of lens 100 is controlled by means of voice coil 20 which is provided with an appropriate dithering signal from function generator 60. This signal also includes an appropriate DC offset control level. Light from lens 100 is directed on to optical disk or CD target 30 from which it is reflected back through lens 100 and diode injection laser 10 to photodetector 40. The electrical signal from photodetector 40 may be employed directly. Alternatively, it has been observed by the present inventors that the drive current passing through diode injection laser 10 is, in fact, modulated by the light returning from the target. Accordingly, by providing a resistor R (reference numeral 90) in the current path of power supply 70, it is possible to extract this same signal as a voltage drop across resistor R by connecting its opposite ends to differential amplifier 50 which provides an alternate output signal. By integrating this signal over an appropriate time period r (measured in milliseconds), it is possible to produce an output resultant signal, also referred to herein as R (not to be confused with the resistance R), which is proportional to the amount by which the lens should be repositioned in order to achieve optimal focus for a particular layer.

For purposes of understanding the operation of the present invention, FIG. 1 should be understood to be a general schematic description for performing the dithering operation on a lens or other optical element through which the light from a laser source propagates. In preferred embodiments of the present invention, the laser light source comprises a semiconductor laser diode. Furthermore, for purposes of the present invention, the dithering function can be thought of as causing the laser light to move back and forth in an oscillatory manner in either of two ways: (1) towards and away from the information medium target; and (2) back and forth across substantially (locally) parallel reference tracks in what is essentially a radial direction as seen with respect to target 30 in FIG. 1. This oscillatory motion or dithering produces a particular signal S×I which can be analyzed in the various manners as taught in the abovereferenced prior application. It is to be particularly noted that analysis of the signal S×I can produce very important information with respect to positioning and control of the laser light source.

It is the precision of position control which permits the present invention to be useful in a number of different ways particularly with respect to laser writing operations. In particular, in accordance with one aspect of the present invention, the dithering of the laser light source towards and away from the target medium provides a mechanism for precision focus control of the laser light within the medium at various depths, that is, within selectable layers. With respect to multi-layered media, the present invention, because of the precision of its focus control, provides a mechanism for precisely determining the focal point of the laser spot within various layers of the disk. This allows multi-layered disk read and write operations.

In another aspect of the present invention, the precise nature of the signal analysis that is carried out by the present inventors provides information relevant to position control in a radial direction. This is particularly useful in those situations where the information stored on the disk or other medium is arranged in a plurality of substantially parallel tracks (for purposes of the present invention, tracks are considered parallel even if curved into spirals or arranged as concentric circles; parallelness is a local phenomenon). In accordance with a preferred embodiment of the present invention, these tracks are arranged in a single concentric spiral. An alternative arrangement for disk storage media employs information and reference tracks disposed on concentric circular tracks at selected radii. In point of fact, the pattern is essentially arbitrary. Multiple spiral tracks are also employable. The present invention also permits different layers within the medium to incorporate different track patterns: one layer could be arranged as a spiral while another is configured in concentric circles. Where desired, each layer in the medium is also provided with its own reference datum mark so as to make it easier to access any part of the disk (or other shape) storage medium via a complete mapping of its surface (radially and angularly). The reference datum is position so that information on different layers of the disk is accessed synchronously with each other.

As is demonstrated below, the signal processing aspects of the present invention permit precise control of the laser so that it may be positioned in a proper focal plane (if needed or desired) and likewise positioned at a known radial location. For purposes of writing information at desirably high densities, this precision is essential.

While the above-mentioned prior application was directed primarily to reading information from a disk, it should be appreciated, however, that writing information to a disk requires a much more precise control mechanism. Furthermore, those skilled in the art fully appreciate that the mechanisms employed for writing and reading should permit a significantly dense configuration of bit patterns on the information storage medium. In the present invention, the precision of control based upon signal processing aspects provide the overall system with the necessary degree of control which permits extremely dense writing of information onto an impressionable medium.

If one is involved in the design of a system for writing information to a disk, one soon fully appreciates that it is not enough simply to write the information to a disk, but, rather, that it is extremely important that the information be written onto those locations from which the data can be retrieved. Again, it is the precision of control associated with the signal processing methods described herein that provides the required degree of precision writing control which is sufficient to achieve the necessary objective of being able to reliably retrieve the information from the recording medium at a later point in time. Additionally, the methods and apparatus described herein also provide an ability to monitor the performance of laser writing source and to also monitor the quality of the medium itself.

In furtherance of achieving the writing and reading objectives of the present invention, a recording medium is employed on which there are already present differentially reflective tracks for selected laser light reflection. (Although differential reflectivity is the preferred approach herein, it should be noted that any optical property difference may be used.) These tracks are employed as a basis for positioning laser sources for both reading information from the medium and for writing information to the medium. Accordingly, as a first aspect of the claimed invention, there is described a disk medium and a method of constructing it with tracks which are appropriate for the purposes of the present invention. It should be noted, in particular, that the design of the present invention fully exploits the capabilities of these special disks. These disks have also been particularly designed for considerations of cost and ease of fabrication. Additionally, the structure of the disk recording media associated with the present invention has been structured so as to maximize, to the greatest extent possible, the density of information which may be written to any particular layer in the disk. It should also be particularly noted that the fabrication methods set out herein are not only useable in the construction of single-layer recording media, but that they are also extended to the construction of multi-layer media.

For a complete understanding of the process involved in constructing recordable media useable with the present invention, attention is directed to FIGS. 2A–2G. These figures show various stages (30a–30g) of construction of a single-layered version of a writable medium useful in the present invention.

Figure 2A:
FIGS. 2A–2G illustrate steps employed in a process which produces blank recording disks for use in conjunction with the system of laser writing used in the present invention.

In the beginning of the process illustrated in FIGS. 2A–2G, it is noted that one begins with disk substrate 30a in FIG. 2A comprising a sufficiently rigid polymeric material such as a polycarbonate resin. It should be particularly borne in mind that the substrate material with which one starts the production of recordable media in accordance with the present invention does not have to include material which is optically flat. This is a decided advantage which results from the presence of embedded tracks to make up for any deficiencies that may occur because the initial starting substrate is not in and of itself necessarily an optically flat piece of material. This clearly has cost advantages for those using the present system.

Figure 2B:

As shown in FIG. 2B, substrate 30a from FIG. 2A is coated with positive photoresist 33. This is readily applied by any number of well known methods including spin coating which is preferred.

Once photoresist 33 is applied to initial substrate 31, the photoresist material is exposed through a mask which, in preferred embodiments, includes a spiral pattern. While preferred embodiments of the present invention employ tracks having a spiral geometry, any convenient track pattern is useable including concentrically arranged circles or multiple (that is, interleaved) spirals. In practice, it is noted that the mask that is employed for creating the pattern seen in FIG. 2C when photoresist 33 is exposed is preferably not a freestanding mask but, rather, is typically a structure which is mounted on a separate rigid transparent material such as quartz.

Figure 2C:
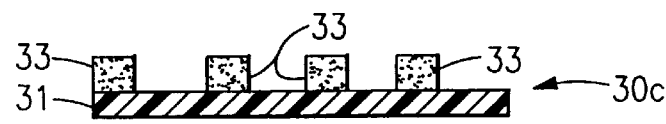
Figure 2D:
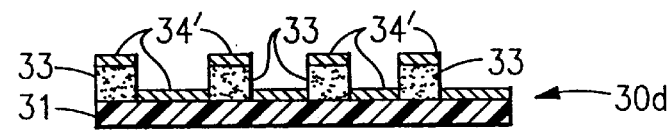

FIG. 2C illustrates resultant structure 30c which results when photoresist 33 is exposed through a desired mask and then developed. The resulting photoresist pattern 33 is actually the negative (in the photographic sense) of the desired track pattern.

It is noted that metal layer 34' is applied to structure 30c. In preferred embodiments of the present invention, this metallic layer comprises aluminum which is approximately 150 to 200 Angstroms thick. It is particularly noted that while aluminum is a preferable material, particularly because it is inexpensive yet effective, other materials such as gold or reflective polymers. In this regard, it is noted that the primarily desirable property for layer 34' is that, in finished product form, it provides a layer from which light is reflected in a different manner than it is from the rest of the substrate material. Accordingly, the present invention finds it very desirable to employ materials having different reflectivities. It is this difference in reflectivity which produces signals from which the present applicants have been able to extract useful positioning information. The other necessary property for layer 34 is that, upon deposition, it adheres to substrate 30 and, furthermore, that, during the photoresist removal process, it does not operate to interfere with photoresist removal. Also, as noted above, optical properties other than reflectivity may be used.

Figure 2E:

The result of photoresist removal, namely, the structure shown in FIG. 2E as substrate 30e, illustrates the result of a wet chemical etch in the photoresist removal process. Typically, photoresist material is removed by a wet chemical etch followed by a cleaning process for removing any residue. The deposited reflective layer 34 which had, in FIG. 2D, been shown as being attached to patterned photoresist layer 33 is now removed in those locations for which this attachment occurred along with the underlying photoresist. It should be noted that the steps illustrated in FIGS. 2A–2E are ones which readily lend themselves to mass photolithographic production techniques. This and subsequent techniques which are also employable in mass production fashion operate cooperatively to keep the cost of production low while at the same time not interfering with the speed at which production can occur.

Figure 2F:

Attention is next directed to the process step illustrated in FIG. 2F in which semi-transparent layer 35 is applied to structure 30e (FIG. 2E). Layer 35 preferably comprises a layer such as polymethylmethacrylate (PMMA) or an equivalent. In preferred embodiments of the present invention, this material is spin coated onto structure 30e. It is noted that at this juncture an optional planarization step may be performed.

It is also important to note that structure 30f, shown in FIG. 2F, is an important structure in that it is the starting point for the deposition of further layers if a multi-layer structure is desired. These subsequent layers may or may not include imbedded track material 34. If tracks are imbedded in subsequent layers, it may be of a different material than that found in lower layers, and in particular, it may have different optical transmissivity properties or use an entirely different optical property.

It is also noted that the process for embedded track creation, illustrated in FIGS. 2A–2G, is fully compatible with providing different information formats in different layers. These formats include the CD-ROM format and the DVD format.

Whether one employs a single-layer or a multi-layer structure, the last layer preferably includes layer 36 which preferably comprises a layer of aluminum which is approximately 50 Angstroms thick for purposes of providing differential reflectivity, logo printing, etc. This is preferably deposited by flash coating. A resultant single layer recordable medium is therefore shown as structure 30g in FIG. 2G.

It is to be noted in the present invention that it is layer 35, the polymethylmethacrylate layer or its equivalent, which is employed for the purpose of providing information storing regions. More particularly, these regions are located between tracks 34.

Figure 2G:

It should also be appreciated by those of ordinary skill in the photolithic arts that the process described above is merely illustrative of a number of different possible processes which may be employed to produce the structure shown in FIG. 2G. In particular, it is noted that the process described employs the utilization of a negative photo mask. Other methods and processes could readily employ positive (in the photographic sense) masks. Processes based on selective deposition, rather than selective removal, are also employable.

It is noted that, with respect to FIGS. 2A–2G, representative cross-sections of the desired recordable media are shown at various stages. In terms of dimensions, however, these figures are not drawn to scale. Nonetheless, the representative relative layer heights as described above are shown.

Figure 3:
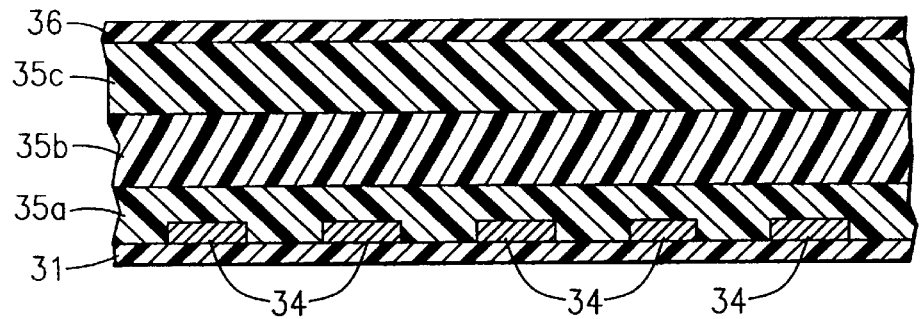
FIG. 3 illustrates a cross-sectional view of a portion of a CD-ROM- like recording disk particularly showing multiple layers in which information may be recorded.

With specific reference to the situation in which a multi-layered disk is produced, attention is directed to FIG. 3. As pointed out above in the stage shown in FIG. 2F, one may again coat the substrate with a layer of recordable material such as polymethylmethacrylate and repeat for as many layers as are desired and are practicable. For example, a three-layer medium is illustrated in FIG. 3. In this cross-sectional diagram, recordable layers 35a, 35b and 35c are shown. Additionally, it is noted that each one of these layers is logically referenced to track 34. It is these tracks which provide a volume reference for the entire solid structure shown in FIG. 3. In particular, it is to be specifically noted that each of the three recordable layers is referenced to the track(s) in the first layer (layer 35a). Thus, tracks provided for writing and reading control are employed as a reference structure for the entire volume of the disk. This feature is particularly important to note for those situations in which three-dimensional volume holograms are employed in conjunction with the present invention; accordingly, it is noted that the utilization of the precision tracking aspects of the present invention are entirely consistent with utilization of holographic storage and holographic storage media. The fact that all three layers shown in FIG. 3 can be referenced to the same set of tracks 34 means that the information in all of the layers shown may be written or read using a single reference. This has a particular advantage in that data synchronization and storage between and amongst the various layers is readily achieved. Accordingly, in the structures of the present invention, particularly that which is illustrated in FIG. 3, it is much easier to maintain logical connections of data present in multi-layers. For example, in those instances where the information stored in different layers represents audio portions of the information in different languages, it is readily seen that it is extremely easy to maintain synchronization between the various aspects of this information because each of the layers is referenced to a common set of tracks.

Figure 4:
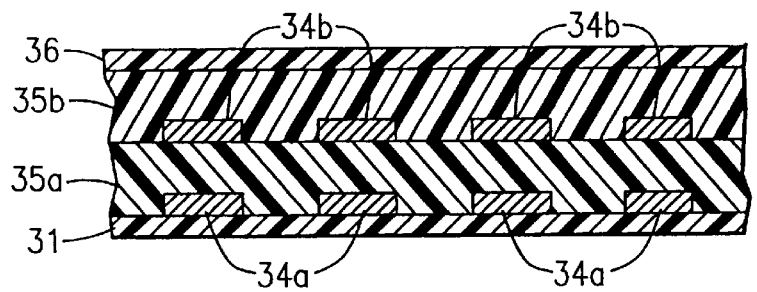
FIG. 4 is a side elevation, cross-sectional view of a portion of a CD-ROM-like recording disk, similar to the view shown in FIG. 3, but here more particularly illustrating the inclusion of multiple servo track layers.
Figure 18:
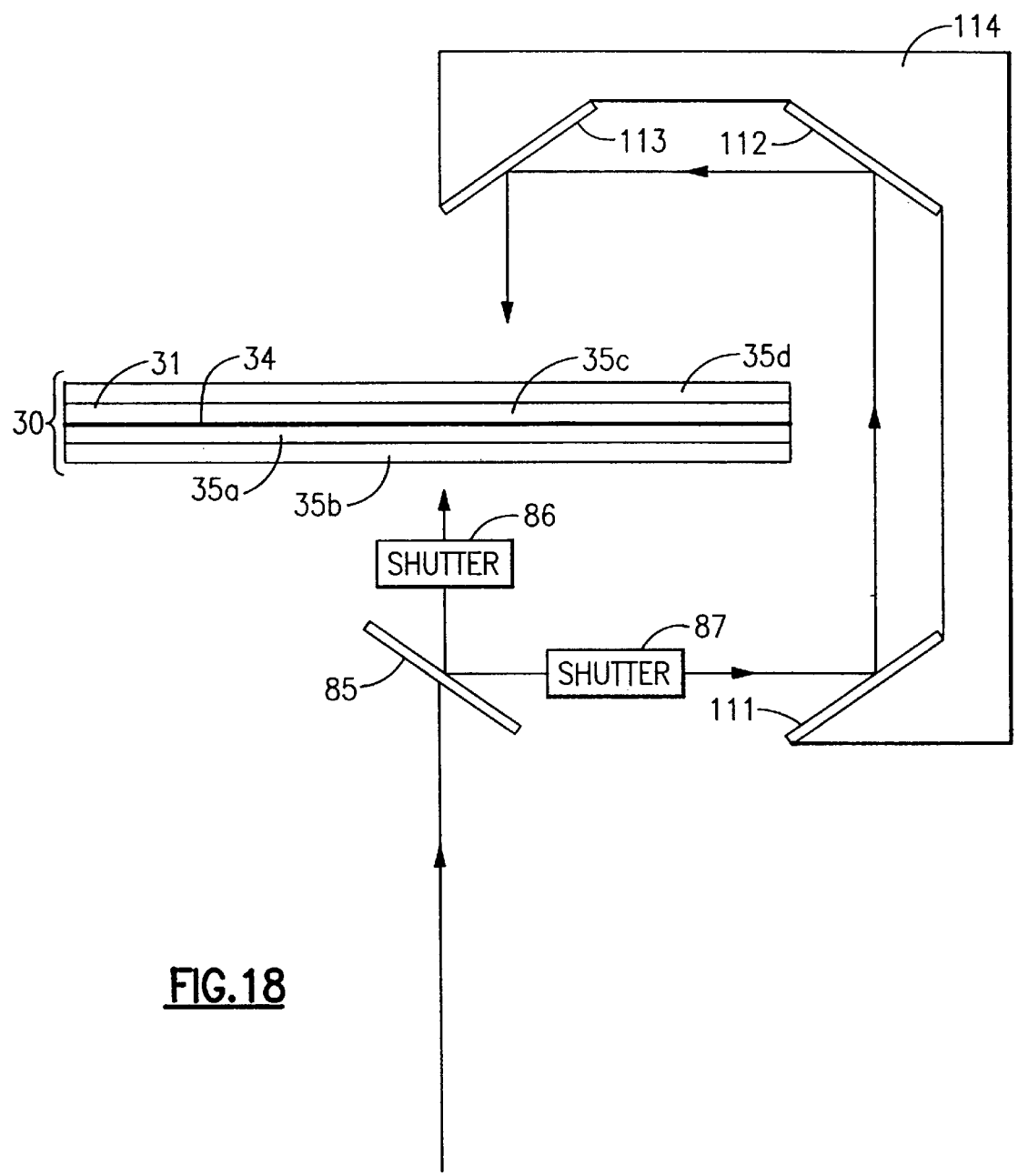
FIG. 18 is a functional diagram illustrating an optical arrangement which is employable as a mechanism for reading and writing information on both sides of a rotating information storage medium blank.

However, it is noted that the present invention may also employ reflective tracks 34 in multiple layers. Such a structure is illustrated in FIG. 4 which is particularly useful in those situations where one wishes to write and/or to read from opposite sides of the disk platter. These considerations are more fully discussed below with specific reference to FIGS. 18 and 19. However, at this juncture, it is to be particularly noted that the structure illustrated in FIG. 4 is particularly appropriate for those circumstances in which one wishes to read simultaneously from both sides of the disk or to write to one side and to read from the other one. This is also particularly desirable in those situations where the data on the different sides is unconnected or unrelated and/or in those situations in which the maximum amount of data transferred in a given instant of time is to be provided. The construction of the structure shown in FIG. 4 proceeds in the same manner as the construction of the structure shown in FIG. 3 with the exception that, before deposition of a second information-bearing layer, a layer of photoresist is applied, exposed and developed and is removed after deposition of a suitable reflective material, such as aluminum, for use as tracks 34*a* and (separate) tracks 34*b* in FIG. 4.

Figure 5A:
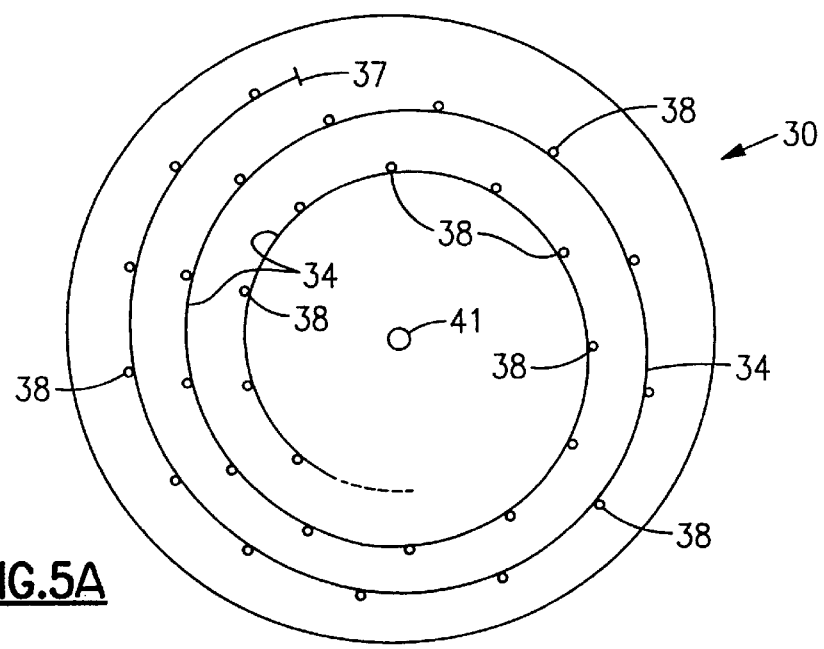
FIG. 5A is a top view (not to scale) illustrating the presence of a registration mark and a spiral track pattern in which servo tracks are preferably disposed.

Attention is now directed to those aspects of the present invention which are illustrated in FIG. 5A. In particular, FIG. 5A illustrates a top view of a recording medium which is constructed in consonance with the present invention. It is, however, noted that the number of spiral tracks shown (one) and the distances between the spiral tracks are employed for illustrative purposes only. In point of fact, there are many thousands of tracks per radial inch and they are disposed much more closely together than is shown. However, in this regard, FIG. 5A is employed for illustrative purposes only.

The most important aspects of FIG. 5A are discussed first. In particular, it is noted that recordable medium disk 30 has imbedded therein (preferably spiral) tracks 34. It is across the edges of these tracks that a laser light is moved in a periodic, oscillatory fashion to provide one form of the desired tracking in the present invention. Frequency doubling and its associated signal processing aspects, particularly including special digital signal processing aspects, are employed to achieve the desired degree of laser beam position control for both reading and writing operations. However, it is noted that it is the writing operations that are primarily (though not exclusively) of interest in the present application.

Figure 5B:
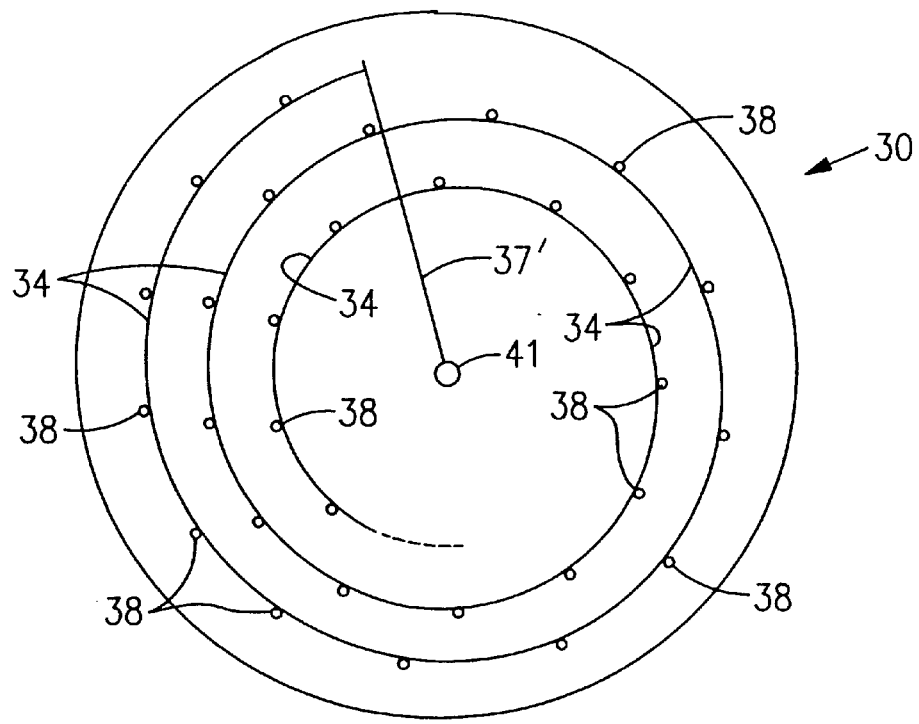
FIG. 5B is a view similar to FIG. 5A but more particularly illustrating a radial reference (registration) mark extending across the entire radial extent of the disk.

One of the important aspects to appreciate from FIG. 5A is that there are shown a plurality of typical laser spot focus positions 38 disposed along the outer edge of track 34. It is noted that the utilization of a spiral track pattern enables continuous edge-following. This edge-following can begin as early as outer registration mark 37 and continue all the way into the central region of the disk, typically spaced some distance apart from spindle opening 41 in disk 30. As shown in FIG. 5B, a registration mark 37' may extend across several tracks and may in fact extend across all the tracks to provide a reference for position determination in the angular or θ-direction.

The tracking of a spot of laser light along an outer edge of a track is important for fully appreciating the difference between the present invention and certain other exemplary systems that could employ track-following methods. In some of these other methods, tracking is accomplished by making sure that the laser spot remains in a location "somewhere between" locally parallel tracks. Thus, in other systems, the spot itself may be present at any one of a plurality of positions between the tracks.

Nonetheless, it is a significant feature of the present invention that track edge-following is employed in special ways. Not only does the present invention employ track edge-following for purposes of providing superb precision and control of laser spot placement, it is seen that this is done in a continuous fashion. Thus, in the present invention, when information is written to a disk, this information may be written in continuous fashion from beginning to end in a manner which assures very precise positioning of the stored information.

It is furthermore seen in the discussions below that, not only does the edge-following technique employed in the present invention produces superior results, it is in fact coupled with a digital signal processing approach which in fact enables multiple information tracks to be written to and read from a plurality of spiral information tracks which run parallel to the tracks 34. In particular, it is seen in the present invention that at least four separate information tracks may be provided between track edges. The present invention, however, provides accurate and precise means for identifying the location of a laser spot for reading or writing so that information is written to any reasonable number of information tracks which lie between reference tracks 34, as provided herein. This aspect of the present invention permits an increased level of information storage density and, furthermore, results in the more precise and accurate writing and retrieval of stored information.

It is noted that a large number of advantages of the present invention arise out of the fact that the present applicants exploit certain signal processing attributes associated with dithering the laser light signal across a reference track edge. In particular, analysis by the present inventors of the resultant output signal provides a mechanism not only for determining when a laser spot is focused on a particular track edge, but they also employ the same fundamental signal processing method to determine the actual distance that the spot is displaced with reference to the track edge. Furthermore, analysis of the signals produced by the method employed in the present invention yields specific information which allows the user (and/or system employed in conjunction with the present invention) to determine which side of the track the laser spot is focused onto. That is, the system of the present invention is readily capable of determining whether or not the laser spot is focused on an inside edge or on an outside edge of any given track. Furthermore, it is also possible, by using the present invention, its circuits, apparatus and methodology, to determine exactly how far from an edge that the laser light is focused. This provides an unprecedented degree of control for laser focal spot positioning. Furthermore, as pointed out above, this is to be contrasted with other systems in which the laser spot is allowed to drift from one track to the next in a sort of bang-bang control system fashion. These other systems only assure that the laser spot is somewhere between tracks. This methodology is clearly deficient in terms of providing optimal information storage density particularly since any inter-track gap can include only one information track per layer.

For the reasons pointed out above, it is therefore important to observe that focusing of laser light onto disk 30 occurs at points 38 which are shown on the outside of track 34. That is, for purposes of illustrating continuous edge following, spots of laser light are shown as being positioned on the outside of the edge of track 34. It should be noted that spindle opening 41, while present in FIG. 5A, is not shown in FIGS. 2, 3 or 4 for the simple reason that these figures merely illustrate typical cross-sectional areas through disk 30 which do not and/or would not include spindle opening 41. (It is noted that the "spots" shown in FIG. 5A are merely illustrative and are not meant to suggest either that the laser is necessarily pulsed or that the spot size is drawn to scale.)

Figure 6:
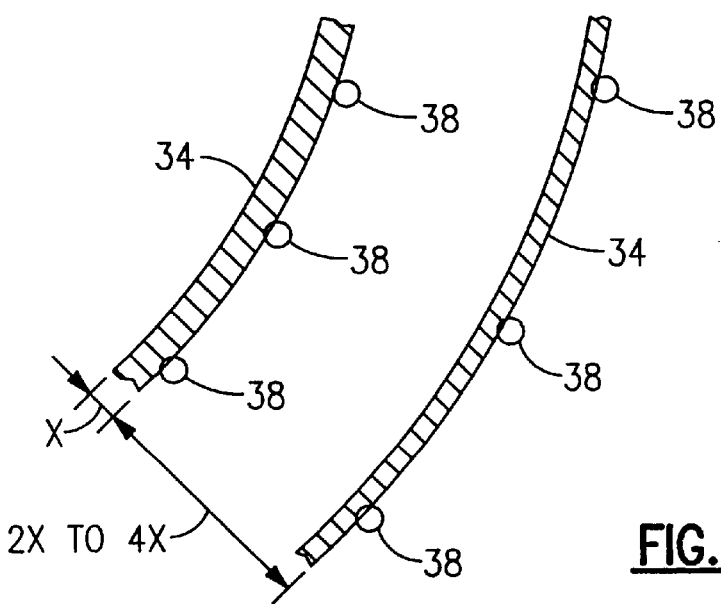
FIG. 6 is a top view illustrating the relationship between servo track width and the width of the medium portion which is employed for information storage.

Further appreciation of the scale and operation of the present invention may, however, be gleaned from consideration of the illustration shown in FIG. 6. FIG. 6 represents an enlarged view of the situation shown at a macroscopic scale in FIG. 5A. In particular, FIG. 6 illustrates some of the spacing aspects of the present invention in terms of the increased ability for information storage in the present invention. FIG. 6 illustrates an area of disk 30 which includes two adjacent portions of spiral track 34. While these spiral track portions extend in a curved fashion around disk 30, nonetheless, in a local microscopic view, track portions 34 are substantially parallel even though curved. In the present invention, the actual width of the track and the space between tracks and the size of optical spot 38 varies depending upon system design constraints, trade-offs and desired disk format, be it CD-ROM, DVD, etc.

In particular, it is noted in FIG. 6 that if one designates the width of a track 34 as X, it is possible to employ inter-track spacing which is approximately 2X to 4X in width. This spacing permits from 2 to 4 tracks of information to be written in the recordable medium between adjacent track portions. This is in stark contrast to the single information track which could be employed in other systems.

One of the items that is evident from the prior patent application which is incorporated herein by reference is that the system and method of the present invention enables one to not only follow the edge of a desired track but, also, enables one to position a spot of laser light in a variety of positions with respect to the edge of a track. These aspects are particularly illustrated in FIGS. 7, 8 and 9. In particular, FIG. 9 below illustrates some of the signal processing aspects associated with the present invention. However, FIGS. 7 and 8 more particularly illustrate how the track-following method of the present invention may be employed to write four separate information tracks in between tracks 34.

Figure 7:
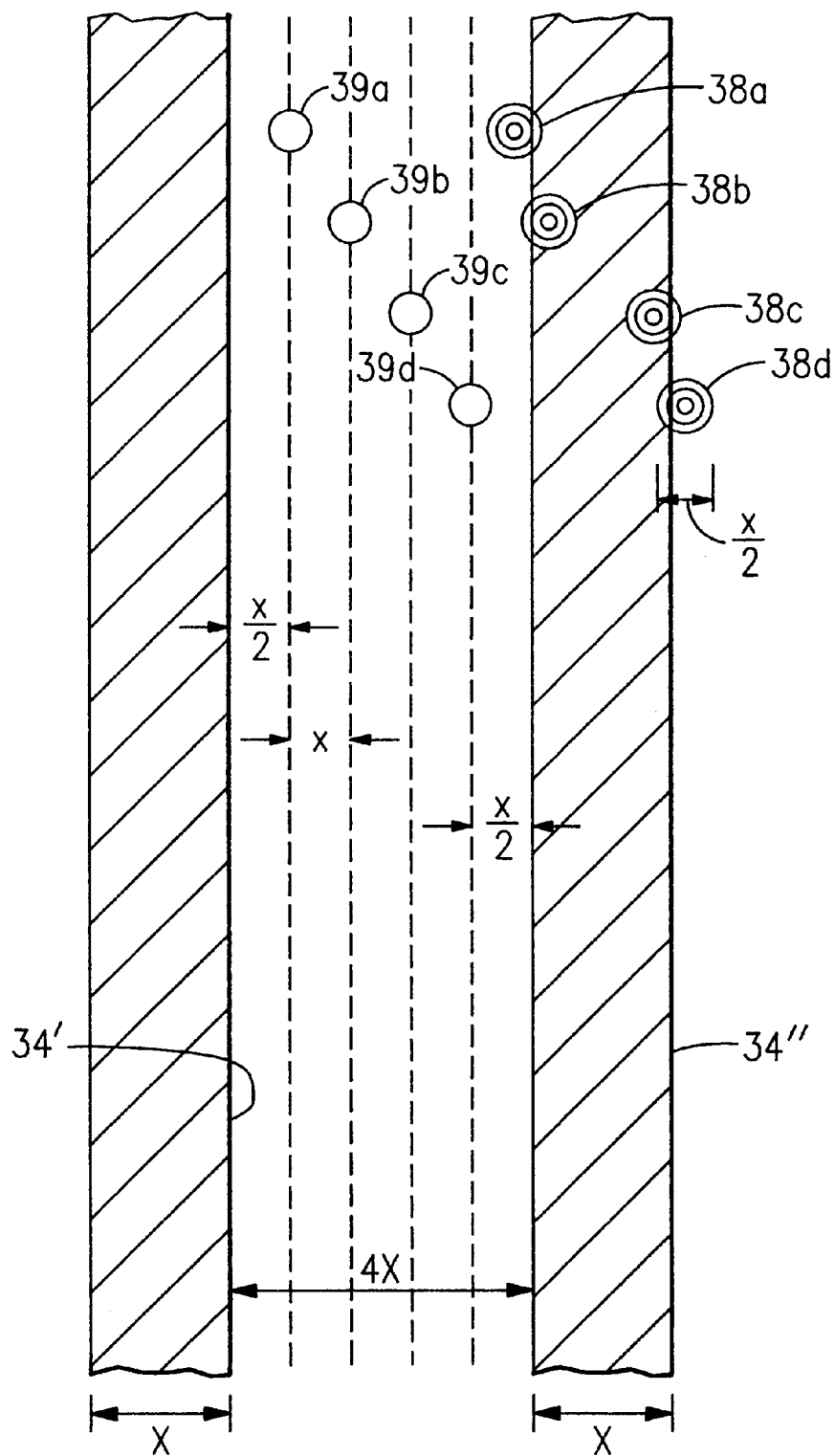
FIG. 7 is a top elevation view illustrating the relationship between spots of laser light employed for tracking along a servo strip and corresponding laser spots which are employed for reading and writing information into recordable material lying between servo track portions.

For example, in FIG. 7, it is seen that tracking spot 38a tracks the "left edge" of track 34'. This tracking permits information writing or reading spot 39a to be positioned approximately 3.5X to the left of tracking spot 38a. Laser beam spot 39a can be used either reading or writing as appropriate over different periods of time. By physically coupling the spacing between laser spots 38a and 39a, it is seen that a track of information may be written at a distance which is approximately X/2 from the right edge of track 34'. By moving tracking spot 38a slightly to the right so that it tracks along the inside of the left edge of track 34', it is seen that an information track may be written with laser spot 39b. In this regard, it is particularly important to realize that the system and method of the present invention provides a mechanism for determining which side of track 34' the laser spot 38 is tracking. In a similar manner by moving laser spot 38b to the position illustrated by laser spot 38c, it is possible to write an information track beneath spot 39c. Again, it is noted that, by tracking along either the left or right edge of track 34', it is possible to write up to four information tracks between each and every reflective reference track 34.

As described above, however, the present invention is not limited to the case in which the ratio between track width and inter-track spacing is 1:4. However, FIG. 7 is nonetheless illustrative of typical gains in information storage density which are achieved by the present invention. In particular, as mentioned above, the present invention provides a definitive indication not only of the specific edge of a track which is being followed, but it also provides an exact indication of the distance between the tracking spot and an edge. As a result, information storage density is limited in a significant way only by the size of the laser spot which may be focused. However, even here, focusing aspects of the present invention in which dithering towards and away from the recordable medium is permitted provides even tighter control of the laser focus spot as it appears in any selected or desired layer of the disk. Accordingly, it is seen that the inter-track spacing of 4X shown in FIG. 7 is illustrative only and that spacings of 5X, 6X and beyond are nonetheless possible with the present invention thus providing for even greater recording density in terms of tracks per inch or information bits per square area. (Tracks 34' and 34' in FIG. 7 are shown as straight lines only for convenience and ease of understanding.)

Figure 8:
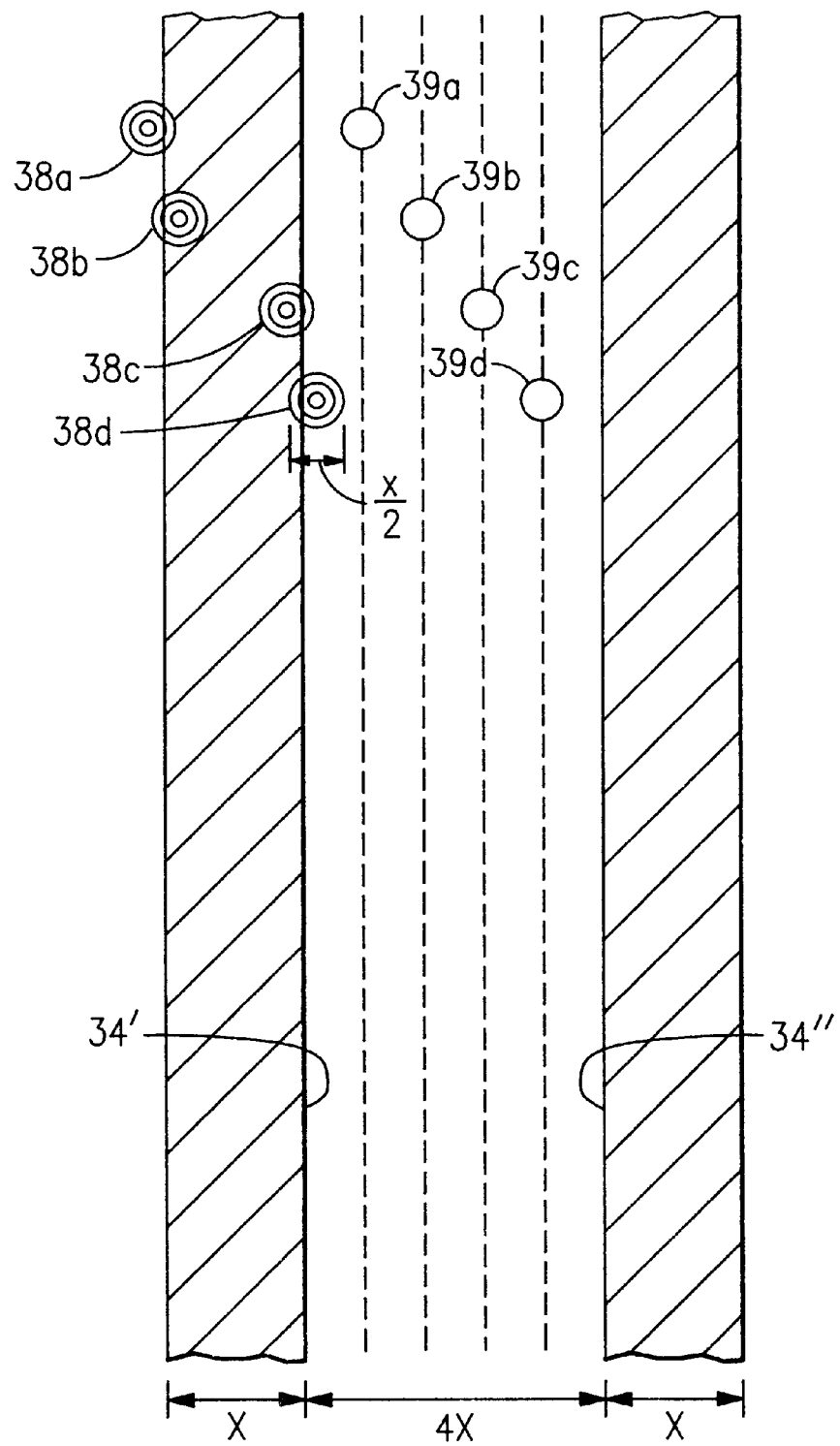
FIG. 8 is a view similar to FIG. 7 but more particularly illustrating the situation in which information is written with respect to the right side of the tracking spot as opposed to the left side which is shown in FIG. 7.

With respect to FIG. 8A, it illustrates yet another aspect of the present invention, namely, the fact that, in contrast to the situation in FIG. 7 where tracking spots lie to the right of information reading and writing spots, the opposite is true in FIG. 8. In particular, in FIG. 8, reading and writing spots 39a–39d are shown to be to the right of tracking spots 38a–38d respectively. Furthermore, it is to be particularly noted that the writing of information tracks between reference tracks 34' and 34' may in fact be determined solely by reference to tracking spots moving along the interior edges shown in FIG. 8, namely, the right edge of reference track 34' and the left edge of reference track 34'. In such a situation, reference trackings spots 38a and 38b would be located in corresponding positions along the left edge of track 34'. Any of these relationships between tracking spot and information spot may be employed in keeping within the parameters, scope and specifications of the present invention.

Figure 9A:
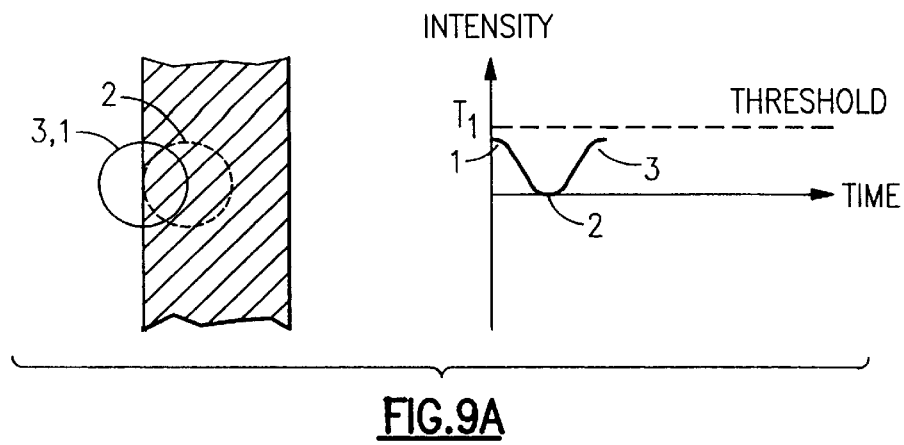
FIG. 9A is a graphical illustration of the relationship between laser tracking spot position and intensity of the resulting reflected signal.
Figure 9B:
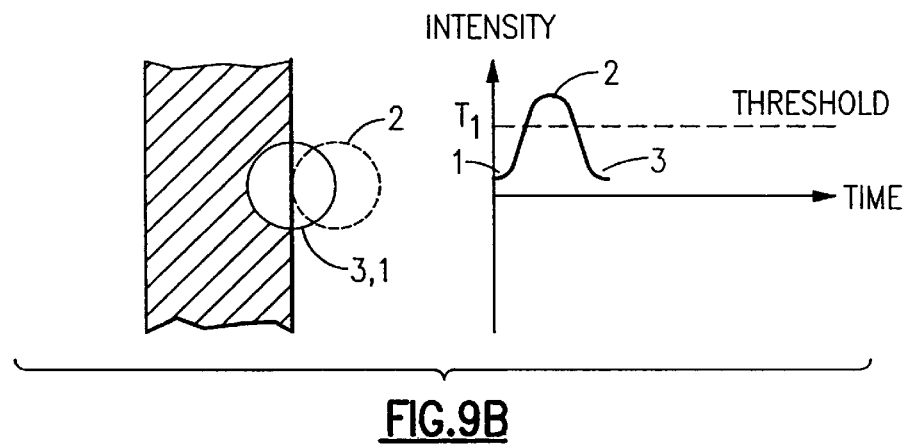
FIG. 9B is a graphical illustration similar to FIG. 9A but more particularly showing the phase relationship of the resulting signal when the laser tracking spot is directed on the opposite edge of the embedded servo track.

Important aspects of the present invention are discernable from the illustrations shown in FIGS. 9A and 9B. In particular, these two figures illustrate the mechanism by which the present invention is employed to discern which edge of a track is being followed. This is essential for an understanding of the operation of threshold detector 81 in FIG. 13 discussed more particularly below. With specific reference to FIG. 9A, it is noted that the spot shown is being dithered back and forth across the edge of a track and appears, during the dithering operation, in one of three positions (1, 2 and 3). Since positions 1 and 3 are the same with respect to the track edge, the resulting intensity of the light reflected back is the same for these two positions. This is shown by the heights of the detected signal coming back as being the same in the graph which forms the right portion of FIG. 9A. It is seen that, because of the difference in reflectivity, the intensity of the returning light varies in substantially the fashion shown. It is minimal when the spot is in the position indicated by dotted lines 2 in FIG. 9A. In the operation of the present invention, the laser light tracking signal reflected back from the recording medium (or the play back medium) is converted to an electrical signal by various means. For ease of understanding the fundamental aspects of the present invention, one should envision the returning (i.e., reflected) laser tracking signal as being directed to a photodetector which converts the light to a varying electrical signal. This signal is shown in the right hand portions of FIGS. 9A and 9B. However, it is to be particularly noted in FIG. 9A that dithering of the spot between the positions shown never results in a situation which produces maximum reflectivity such as that which occurs in FIG. 9B when the tracking spot is entirely outside the boundary of the track edge which is being followed. Rather, in the case illustrated in FIG. 9B in position 2 (shown by a dotted line circle), there results a peak or maximum value for the electrical signal which is produced. In accordance with the principles of the present invention, the relative phase difference between the signals shown in FIGS. 9A and 9B is readily seen to be employable to determine which track edge is being followed, namely, the left edge in FIG. 9A or the right edge in FIG. 9B. A convenient threshold value $T_1$ is easily determined and employed as one mechanism for discerning differences between signals from FIG. 9A from corresponding signals from FIG. 9B. It is important to note that, in the practice of the present invention, it is very desirable, particularly in certain embodiments, to be able to determine on which side of the track the laser is focused. This information is, therefore, seen to be correspondingly important for determining, in both relative and absolute fashions, exactly where one is with respect to reference tracks on the disk and also with respect to other potential fixed reference points on the disk including things such as registration mark 37.

Figure 10:
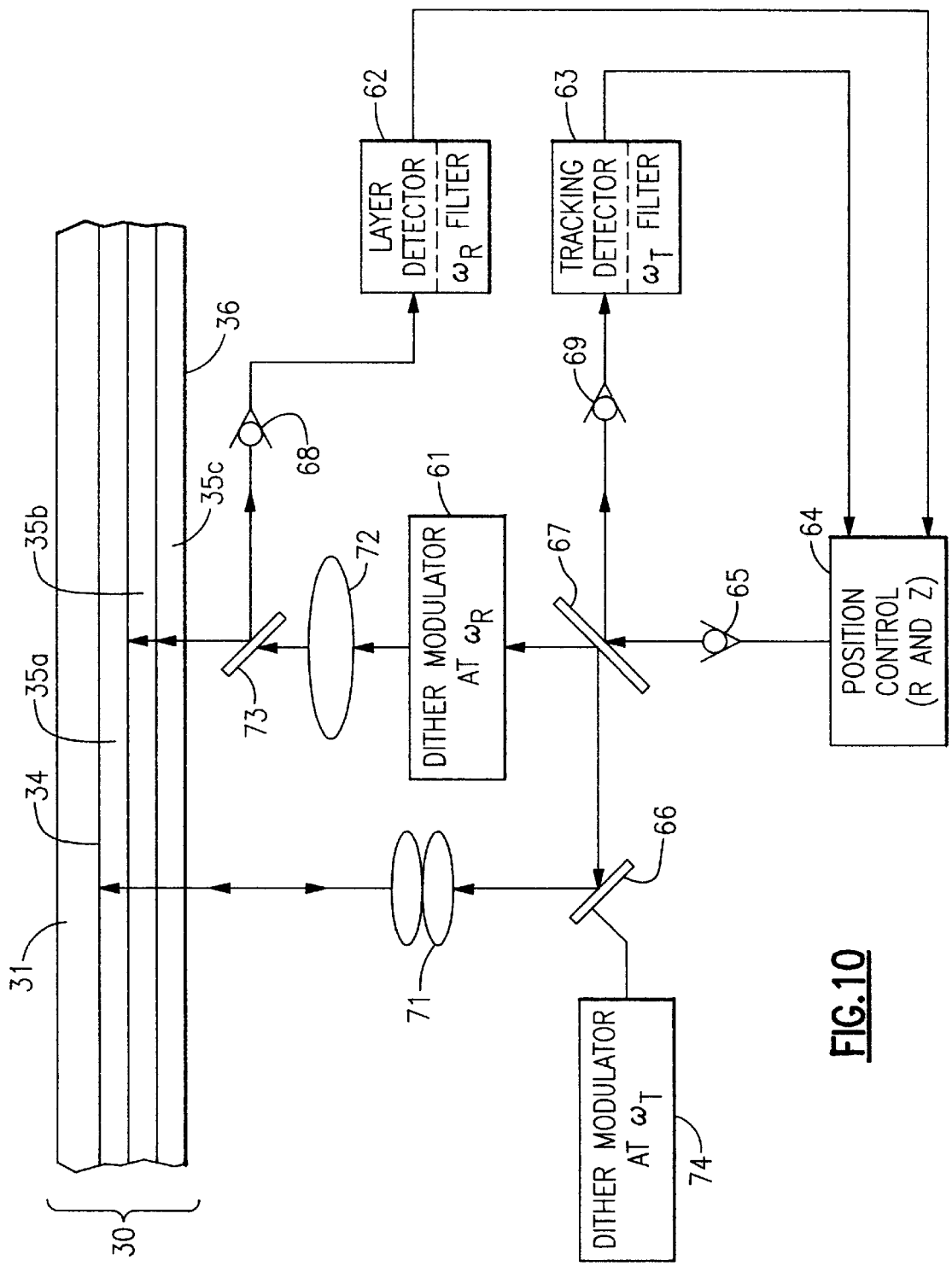
FIG. 10 is a functional block diagram illustrating an overall system of laser light production and laser position control employing the servo tracking system of the present invention.

Next is considered the embodiment of the present invention which is illustrated in FIG. 10. With specific reference to FIG. 10, it is important to note that certain embodiments of the present invention employ the laser diode source in a second role, namely, in the role of signal detector. However, with specific reference to FIG. 10, it is noted that the embodiments shown therein are ones in which separate photodetectors are provided. For a discussion of embodiments of the present invention in which the laser source is also used as a detector, attention is directed to FIG. 17 and to the discussions below concerning this figure. However, since FIG. 10 does not specifically include this particular feature, it should be observed that instead, in the embodiment shown in FIG. 10, there are included separate photodetectors 68 and 69 which function as mechanisms for controlling focus in a desired layer and for controlling position with respect to a reference track, respectively.

In the embodiment shown in FIG. 10, laser light source 65 is controlled in two different directions by means of position control circuit 64. These control circuits are more particularly described above and in prior application Ser. No. 08/626,302 filed Apr. 1, 1996, which has been incorporated herein by reference as mentioned above. In particular, with reference to the situation in which the recording medium is a rotating disk having reference tracks, it is noted that position control circuit 64 is used to position laser source 65 in a radial direction with respect to one or more edges of the embedded reference tracks. In a similar fashion, the signal from layer detector filter 62 provides position control information for achieving focus of the light from laser 65 within a specific layer (35a–35c) of multi-layer medium 30. Focus control is provided either by moving laser light source 65 in a direction towards and away from medium 30 (the Z-direction) or by varying the focus of lens 72.

Laser light from source 65 is directed to a first beam splitter 67 which directs a first beam to medium 30 through lens 72 and beam splitter 73. As described above with respect to controlling focus so that focus lies within a particular layer, dithering at a frequency wR is provided so that either lens 72 or laser source 65 are in effect moved towards and away from medium 30. However, it is noted that, in preferred embodiments of the present invention, dither modulation is preferably achieved either by controlling the focal length of lens 72 in a mechanical fashion or in an electromechanical fashion or by changing the focal position of lens 72 with respect to medium 30. This is considered simpler than dither modulation achieved by moving laser source 65.

A second beam from beam splitter 67 is directed to reflective means 66 which is likewise dither modulated (that is, moved oscillatorilly) at a different frequency $\omega_T$. This dither modulation is provided by any convenient means such as by use of a piezoelectric element attached to a mirror or by an electromechanical device. In contrast to dithering produced by modulator 61, the dithering achieved by modulator 74 such as to move a beam of light backwards and forth across an edge of reference track 34 in medium 30 for purposes of providing focused control of this reference beam, it is preferably directed through lens system 71 as shown in FIG. 10.

An important aspect of note in FIG. 10 is the fact that dithering at two distinct frequencies $\omega_R$ and $\omega_T$ is employed.

Dithering at the frequency $\omega_R$ is employed and operates to provide control of focus so that the focus is in fact maintained in a desired layer within medium 30, even if there is only one layer. In a similar fashion, the dithering at frequency $\omega_T$ is employed so as to provide position control in a radial direction for spinning disk media. Dithering at frequency $\omega_T$ is used to control positioning of laser light source 65 in a radial direction.

It is noted that the preferred embodiments of the present invention employ semiconductor laser diodes as the laser light source. It is to be noted that this particular embodiment is desirable though not necessary in the system shown in FIG. 10. In those systems of the present invention in which the laser light source operates both as a source and detector, the use of semiconductor laser diodes or similar sources is required. However, when it is not specifically desirable to utilize the drive current variant phenomenon that occurs when laser light is directed back into the semiconductor laser, separate photodetectors are employable. In these circumstances, the photodetectors may be of any convenient type in these circumstances.

In order to segregate desired feedback control signals, the apparatus shown in FIG. 10 employs filters 62 and 63, each of which may be designed as a band pass filter centered about the specific control dithering frequency ($\omega_R$ for focus control and $\omega_T$ for position control with respect to embedded reference tracks in medium 30). Using the signals from photodetectors 68 and 69, position detection and control is provided in accordance with the descriptions found above. In particular, it is noted that position control may be achieved in either an analog or in a digital fashion with the digital fashion being preferred.

Figure 11:
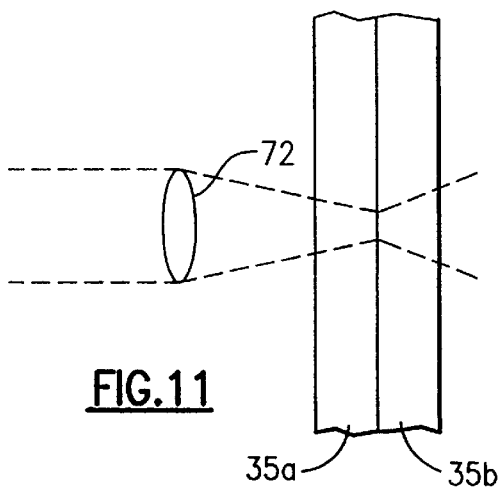
FIG. 11 is a side elevation view illustrating positioning of a lens so that its focal point lies in the proper plane.

FIG. 11 illustrates a small portion of the apparatus shown in FIG. 10. However, and more importantly, it illustrates the notion of being able to adjust either the position of lens 72 or the focal length of lens 72 for purposes of initially determining and, subsequently, for controlling the position of the focal waist plane which is the point of narrowest focus for light beams 72 traveling parallel to the central axis of lens 72. Thus, focus position within either layer 35a or 35b is determined and, in fact, controlled by the use of a deformable lens or lens positioning mechanism.

Figure 12:
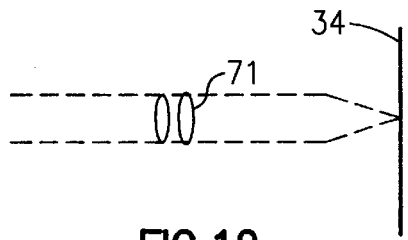
FIG. 12 is a view, similar to FIG. 11, illustrating collimation of laser beam output.

FIG. 12 illustrates the lens system which is specifically employed for directing a tracking beam onto reference tracks 34. In a multilayer disk, it is necessary for the light beam to pass through several layers of the disk to read the tracking marks. The present invention employs a compound lens system which keeps the beam collimated over a longer distance so that it can reach the servo layer, rather than a simple lens which delivers light to the data layer. The compound lens keeps the tracking beam from diverging too soon within the disk.

Figure 13:
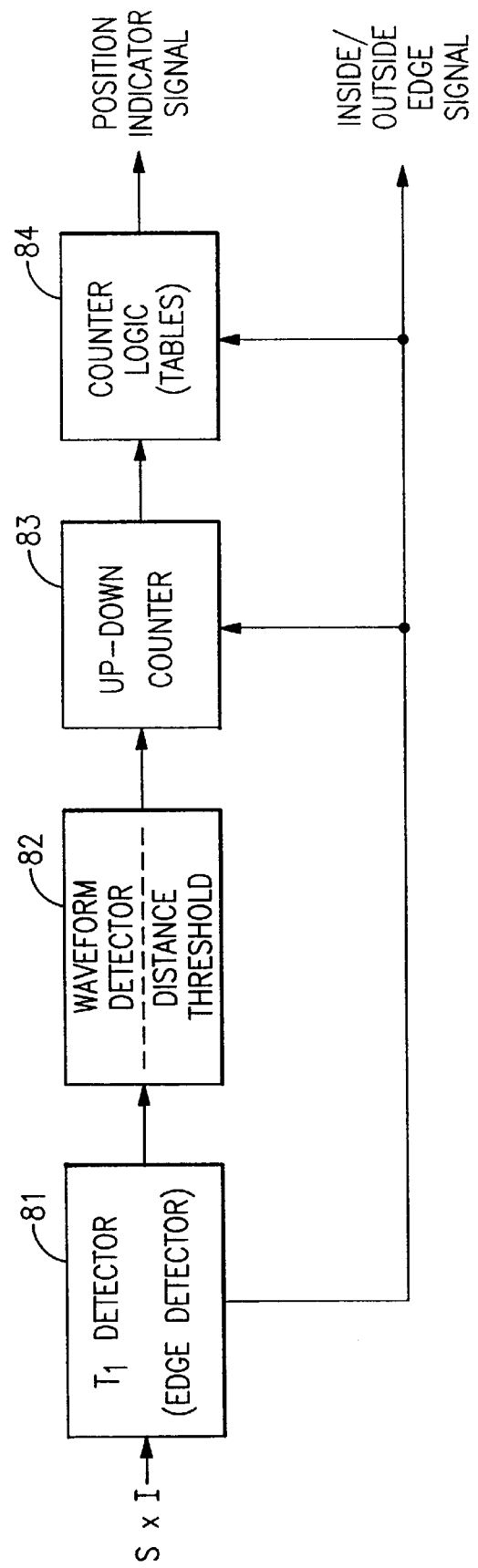
FIG. 13 is a functional block diagram illustrating a signal processing circuit which is employed to provide position indication in a radial direction.

Next is considered the specific circuit shown in FIG. 13. In this regard, it is noted that an optimal understanding of the function of the circuit shown in FIG. 13 is best comprehended from consideration of FIGS. 9A and 9B. There are in fact two principle operations which are performed by the circuit shown in FIG. 13. The first and primary function is to determine which of the two sides of a given reference track the tracking beam is focused upon. In particular, for spiral or concentric tracks on a disk, the beam may be focused on an inner edge (or left track edge as seen in FIG. 6) or an outer edge (or right track edge as also seen in FIG. 6). These two situations are shown in FIGS. 9A and 9B, respectively, (in particular, the differences are shown in the left-hand portion of FIGS. 9A and 9B). The signal S×I, as seen in FIG. 1, is first passed through threshold detector 81 which employs a value $T_1$, as shown in the right-hand portions of FIGS. 9A and 9B, to determine whether or not the spot is tracking along an inner or outer (left or right) edge. If one were reading or writing from only a single information track disposed between reference tracks, threshold detector 81 would suffice for providing a reference signal. However, as illustrated in FIG. 7 or 8, it is possible to employ multiple information tracks between reference tracks. In such cases, it is necessary to know more specific information about the position of the laser spot. In such cases, it is necessary to know the specific signal values at the point 1, 2 and 3 as labelled in the right-half portion of FIGS. 9A and 9B. While detector 81 can essentially determine the phase of the signal S×I using the threshold value $T_1$, as seen in FIGS. 9A and 9B, it is seen that more information with respect to specific signal intensity levels are needed to determine on which of the four positions shown in FIGS. 9A and 9B the spot is located. In this regard, it should also be particularly noted that, while detector 81 is described herein as being a threshold detector, it is also possible to implement detector 81 as a phase difference detector which determines the fact that the signals shown in FIGS. 9A and 9B are respectively 180° out of phase with respect to one another. Waveform detector 82 functions to discriminate between the two waveforms shown in FIGS. 9A and 9B irrespective of vertical DC shifts in the signal patterns. The output signal from waveform detector 82 is supplied to up-down counter 83. This counter responds to changes in detected laser spot position as seen by waveform detector 82 and threshold 81. Thus, as the central focal spot of the tracking beam is moved across the edges of sequential reference tracks, a counter is provided which indicates a binary number which is essentially an information track address. In preferred embodiments of the present invention, this counter value/address is supplied to counter logic block 84 which includes tables therein which map specific binary counts to provide a radial position indicator signal. Thus, each information track on the medium is provided with a reference address to which the reading or writing head may be immediately directed. Accordingly, the circuit shown in FIG. 13 provides important advantages in systems employing the present invention. In particular, it provides a mechanism for addressing individual track locations on a medium such as a rotatable disk. In particular, it provides addressability in a radial direction. The other aspect of addressability described herein relates to addressability in the θ-direction. This aspect of the invention is described in more detail below. For the moment, it is sufficient to appreciate that motion of the tracking spot across reference track edges produces electronic signal indications which describe not only which side of a track on which one is located, but also provides an indication of the specific distance away from the edge of a reference track for purposes of specifying a definite one of a plurality of information tracks located between reference tracks. For purposes of illustration herein, it is noted that the system described shows four information tracks between reference tracks. This provides essentially a 4 to 1 advantage over other schemes which employ only a single information track between two adjacent reference track portions.

Figure 14:
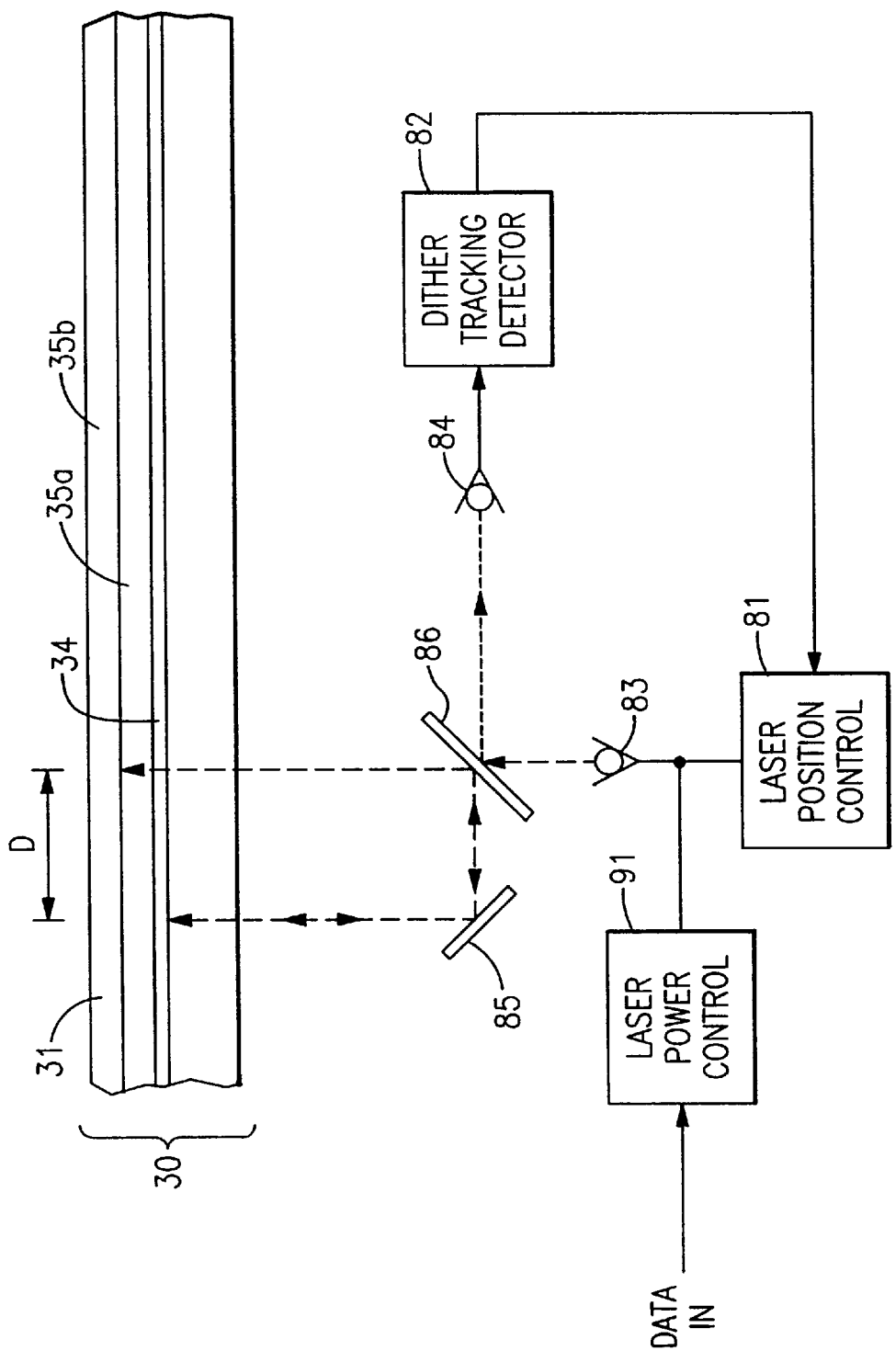
FIG. 14 is a functional block diagram illustrating an alternate embodiment of a system in accordance with the present invention.

Attention is next directed to the exemplary system shown in FIG. 14. The system shown therein is provided for the purpose of writing information onto a recordable medium. In particular, in the embodiment shown, the laser light source is not specifically employed as a detector. The role of the photodetector in the embodiment shown is provided by separate photodetector 84 which receives light from beam splitter 86 which divides the laser light output from source 83 into a first beam for writing onto select layers within medium 30 and a second beam which is supplied to ditherable reflective means 85. As described above, reflective means 85 preferably comprises a mirror to which is attached a vibratable mechanical element such as a piezoelectric device. This element provides a dithering action for the tracking beam which is reflected back and forth across an edge of reference track 34 which, as described above, is preferably disposed in a spiral pattern on a rotatable disk which is capable of being modified by action of impinging laser light for the purpose of information storage.

It is to be particularly noted that, in accordance with the principles of the present invention, such media include the typical CD-ROM disk and additionally include such systems as magneto optic disks. The principle requirements are that the medium include a reference track having differential reflective properties and that the medium itself be capable of storing information by operation of laser light impingement.

In operation, the apparatus shown in FIG. 14 writes information by modulating, via laser power control 91 which determines laser drive current and thusly, the output power of laser source 83. Clearly, one requires a relatively high intensity beam for writing purposes. Typically, in normal operations associated with compact disk information storage, the ratio between laser power for writing and laser power for reading is approximately 10 to 1, respectively. Clearly, it is not necessary for full laser power to be supplied to the tracking beam which is directed to ditherable reflector 85. In this regard, it is noted that beam splitters, such as beam splitter 86, are readily available in which various amounts of laser power are directed in differing directions. For purposes of tracking, a signal of only a few percent of maximum laser strength is required. Nonetheless, because of the particular arrangement provided in FIG. 14, it is very desirable that photodetector 84, together with any corresponding electrical circuitry for amplification, detection or conditioning, exhibit an appropriate dynamic range since, during write operations, a greater than average level of laser power is directed via beam splitter 86 to photodetector 84. Because the dithering provided to reflective means 85 is at a specific and known frequency, the signal which is analyzed via photodetector 84 only needs to be considered for its information content in the spectral region in the vicinity of 6), the frequency at which dithering modulation is applied to reflective means 85. As described above, the resulting signal S×I is analyzed by a dither tracking detector circuit such as that seen in FIG. 13 (or in the application incorporated herein by reference). This information is supplied to laser position control 81 which adjusts the position of laser light source 83 in a radial direction. For purposes of topic focusing, simplicity and ease of understanding, the system shown in FIG. 14 is not illustrated with feedback loop control means in place for laser focus control. Such a feedback loop is, however, illustrated in the method described above and below with specific reference to FIGS. 10 and 17.

During write operations performed by the apparatus shown in FIG. 14, data supplied to laser power control 91 is used to vary the drive current in a device such as a semiconductor laser diode. Modulated laser light from source 83 is supplied, via beam splitter 86, to medium 30 on which it impinges to cause the writing operation. The writing operation occurs at a distance D from the point of reference on track 34 which is used as a point of reference for precision writing. The value D ranges typically from approximately tens of microns to about 1 mm.

It is to be noted that proper operation of the apparatus shown in FIG. 14 is possible because photodetector 84 and dither tracking detector circuit 82 may be employed to detect only those information signals in the vicinity of $\omega_T$, the frequency at which reflective means 85 is dithered. Thus, tracking information is very easy to select out from any other signals impinging upon detector 84. It is also to be noted that the embodiment shown in FIG. 14 is particularly desirable and useful insofar as the operation of the device shown in FIG. 14 is concerned; in particular, it is noted that dense writing operations of multiple tracks of information between reference tracks is made possible because of the precision provided by the tracking method described herein whose theoretical basis is described above with respect to FIGS. 9A and 9B.

With respect to most of the embodiments described herein, it is very important to note that precision of information position control is much more critical in operations involving writing than in those operations involving reading. Write operations create a permanent or semi-permanent change in the recording medium. If this information is to be subsequently read in a reliable and efficient manner, it is extremely important that writing consistency be present in the writing system. Accordingly, one will find that this position precision is a hallmark of the systems described herein.

Figure 15:
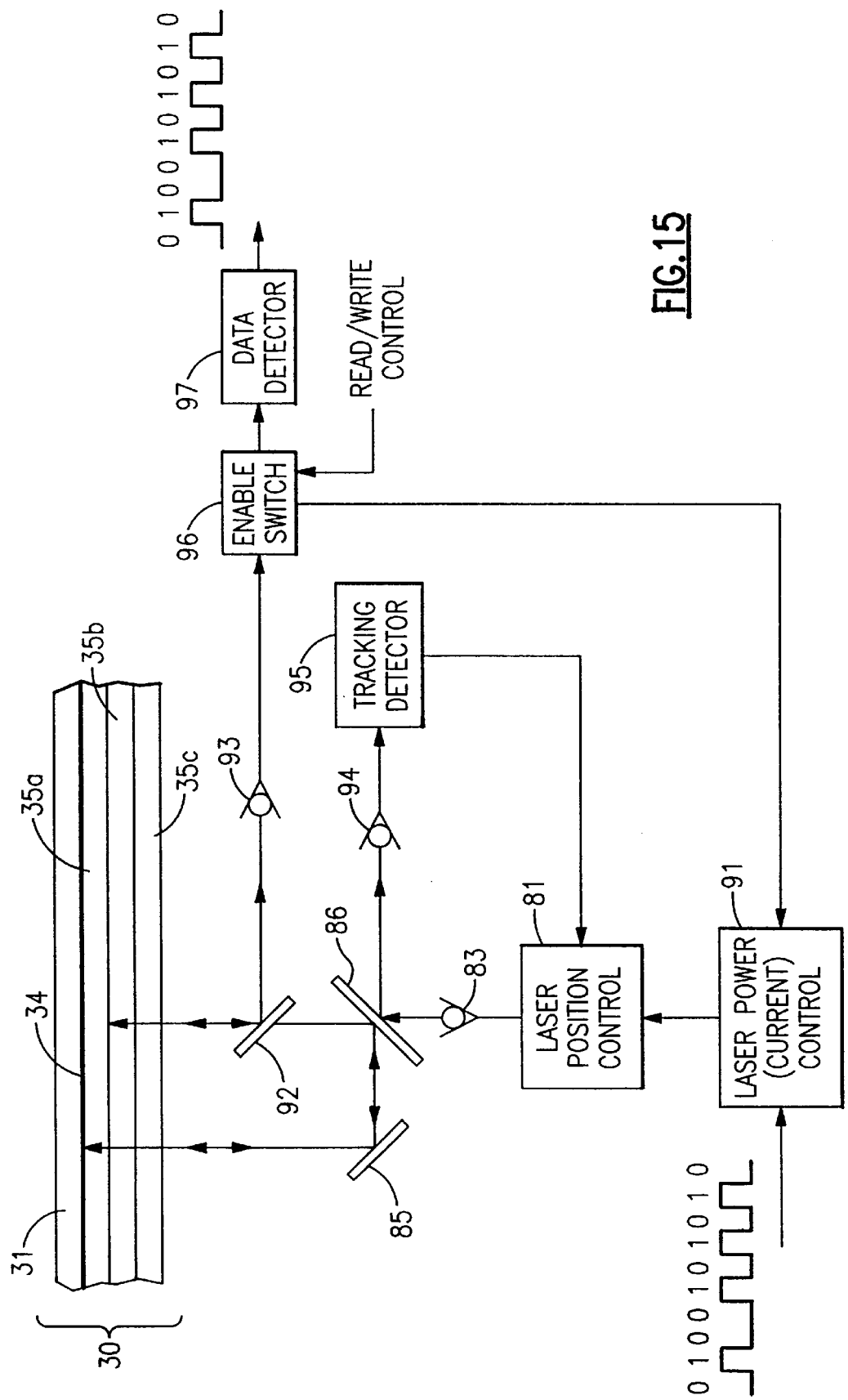
FIG. 15 is a functional block diagram illustrating a system in accordance with the present invention in which laser power is modulated to produce the desired writing and read-after-writing operations.

Attention is next directed to the specific embodiment illustrated in FIG. 15. This embodiment is particularly directed to a system and method for information writing. The system shown permits a string of data bits entering laser power control unit 91 to be written into a recordable layer on disk 30. As with all embodiments of the present invention, disk 30 includes layer 34 which is employed for reference and tracking purposes. Laser 83 provides a light signal both for reading and for writing purposes. Laser power control unit 91 determines the level of drive current for laser 83 thus determining whether or not information is to be read from or written onto the disk storage medium. Typically, there is a ratio of approximately 10 to 1 between the level of laser power desirable for writing information in comparison with the level which is desirable for reading information. Accordingly, this dynamic range of laser power signals should be accommodated by photo detectors 93 and 94.

Light from laser 83 is first provided to beam splitter 86 which passes on a portion of the light to beam splitter 92. A smaller fraction of the laser power is directed towards reflective means or mirror 85 which in turn directs laser light from the tracking beam onto reference track 34. This mirror is dithered in the same fashion as shown for mirror 66 in FIG. 10. This dithering operation is employed in accordance with the tracking principles of the present invention and, in fact, returns reflected light from the disk storage medium to mirror 85 and, thence, to splitter 86 and to photodetector 94 which supplies the resulting electrical signal to tracking detector 95. An appropriate circuit for tracking detector 95 is shown in FIG. 13.

The portion of laser light signal from laser 83 which is not directed to mirror 85 is instead directed to beam splitter 92. The emitted laser light is thus directed from beam splitter 92 to a particular one of the layers in the recording medium. During read operations which are controlled by the read/write control signal line which is supplied to Enable Switch 96, the laser power is set on its lower (reading) level power and switch 96 is enabled to pass reflected photodetected signals to data detector 97 which supplies the output signal. Photodetector 93 senses the variation in reflection caused by previously written physical variations in a selected layer of the recording medium. During write operations, the read/write control signal line turns the enable switch off so that data detector 97 is not fooled into believing that a data signal is present at its input. At the same time, the read/write control signal line, either indirectly through enable switch 96 as shown or as directly controlling laser power control 91, causes the laser power output to be increased to the appropriate level for writing information onto rotating disk 30. In the embodiment shown in FIG. 15, reading and writing operations are not carried on simultaneously but, rather, are spaced apart in time.

Figure 16:
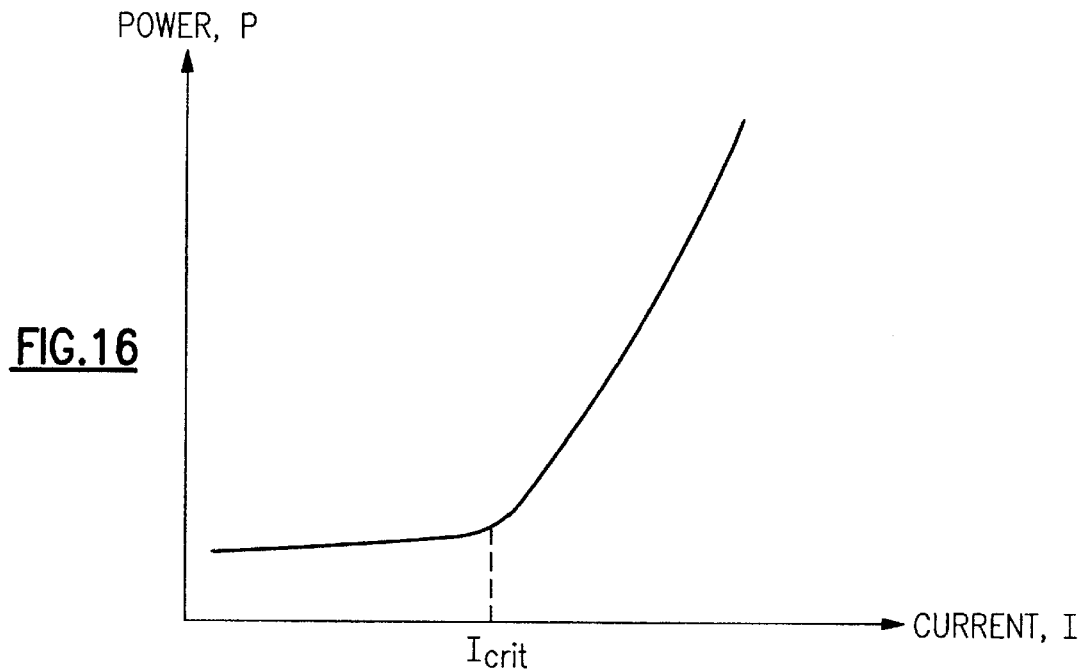
FIG. 16 is a plot of laser light power as a function of semiconductor laser drive current.

FIG. 16 is included and is discussed at this time in conjunction with the above discussion with respect to the system shown in FIG. 15 which is used for writing. In particular, FIG. 16 illustrates the fact that the power in a semiconductor laser beam is a function of semiconductor device drive current. In particular, it illustrates the fact that there is generally a current threshold, Icrit, below which lasing action does not start or is ineffectual. However, once a threshold current level is reached, the power in the laser beam is increased approximately linearly with increasing levels of current. While not specifically illustrated in FIG. 16, it is noted that, generally as semiconductor laser devices age, the curve shown shifts further out to the right. This means that, as a typical semiconductor laser device ages, the amount of power present in the laser beam decreases. Nonetheless, it should also be appreciated from FIG. 16, including those versions which are shifted to the right, that, as a laser device ages, it is possible to compensate for reduced laser power content by increasing the drive current supplied to the laser. This aspect of semiconductor laser operation is relevant for an understanding of the different laser power levels used in the system shown in FIG. 15 and is additionally relevant for an understanding of some of the monitoring and compensation functions that can be performed in conjunction with the use of the tracking and accuracy aspects of the present invention.

Figure 17:
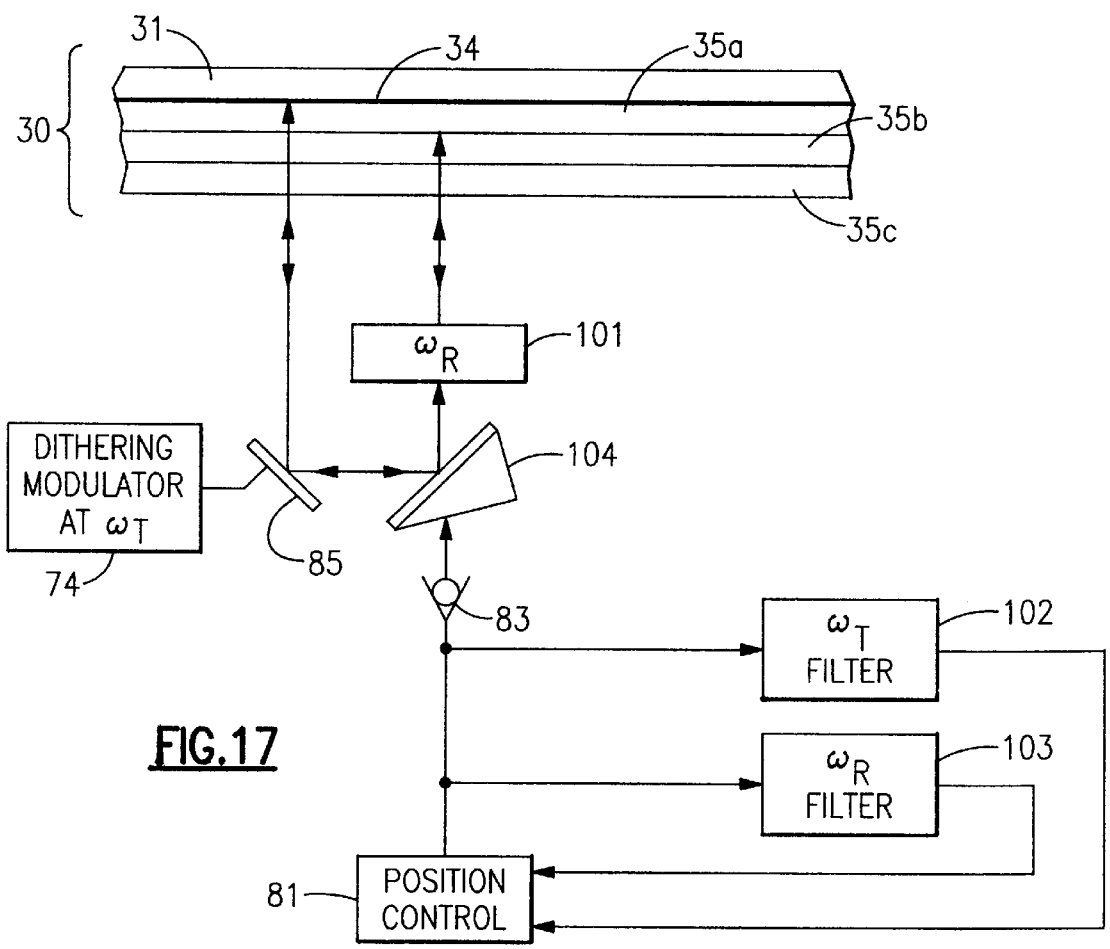
FIG. 17 is a functional block diagram illustrating an embodiment of the present invention employing multi-frequency dithering.

FIG. 17 illustrates yet another embodiment of the present invention. In particular, the embodiment shown in FIG. 17 employs dithering at two different frequencies $\omega_R$ and $\omega_T$. More particularly, it is seen that laser source 83 supplies a beam to beam splitter 104. As in previous embodiments, one part of this beam is used for reading information within various levels of the recording medium and the other portion of the beam, namely, that which is directed to reflective means 85, is referred to as a tracking or reference beam and is directed to reference layer 34 within the recording medium, as illustrated in FIGS. 5, 6, 7 and 8. The tracking beam is moved back and forth in an oscillatory manner by dithering modulator 74 which operates at a frequency $\omega_T$. Dithering modulator 74 preferably comprises a piezoelectric device or a voice-coil-activated vibration device. The resulting reflected signal is supplied to beam splitter 104 returning upon reflection from the medium and is directed into semiconductor laser source 83. It is particularly noted that, in this embodiment, laser source 83 is operating as both a source and as a detector in the manner described above. The embodiment illustrated in FIG. 17 is employed primarily for the writing or creation of information on rotating disk medium 30. Information reading circuitry is not shown for the purposes of FIG. 17 which, as indicated, is essentially directed to writing operations.

Of particular note is the fact that laser light source 83 also operates as a detector for the returning reference beam and produces signals which have multiple components centered at different frequencies. One of these components is centered around the vicinity of frequency $\omega_T$; the other is centered around frequency $\omega_R$ which is introduced into the system through the operation of focus dithering means 101 which is typically implemented as a lens moving towards and away from the medium at a frequency $\omega_R$ or which is somehow varying its focal parameters at the same frequency. These frequencies are chosen so as to be readily separatable from one another by $\omega_T$ filter means 102 and $\omega_R$ filter means 103. These filters are preferably standard band pass, high-pass, low-pass (or combinations thereof) filters as appropriate and may be either active or passive circuits. In typical operation, $\omega_T$ is preferably between about 5 and 50 KHz while $\omega_R$ is preferably between about 0.5 and 5 KHz. Two band pass filters 102 and 103 may be employed or a high pass and low pass filter may also be employed as long as the frequency ranges do not significantly overlap. In this way, two separate position signals are provided to laser source position control unit 81. This unit positions source 83 in a radial direction as a result of the signals provided from $\omega_T$ filter 102. Likewise, position control element 81 moves laser light source 83 towards or away from the medium to control focus in a desired level by means of the signal that is provided by $\omega_R$ filter 103. Thus, tight control is provided for positioning laser light source 83 in a radial direction on the disk and also for positioning the light source at an appropriate distance away from the medium so that its focus remains steadily within a selected layer. Clearly, in the situation shown in FIG. 17, position control unit 81 includes the tracking detection circuitry shown above in FIG. 13. Also of note in FIG. 17 is that beam splitter 104 is shown herein as a prism to indicate the use of such a device as an alternate to the standard, simpler beam splitters shown elsewhere herein.

From the description provided above concerning the manner in which recordable media useable in the present invention may be manufactured, it is clear that there is nothing in the cited process which prohibits recordable surfaces from being present on both sides of a rotatable medium. Accordingly, it is seen that it is possible to read and write information from opposites sides of the same disk. An assembly for accomplishing this objective is particularly illustrated in FIG. 18. This figure particularly illustrates the presence of layers 35*a* and 35*b* on a first side of the medium and layers 35*c* and 35*d* on the opposite (second or obverse) side of the medium. In such an embodiment, systems, such as are described above, are employed in duplicate or in parallel with two lasers being disposed on opposite sides of the medium so that it can have both of its sides read from or written to at the same time in an independent manner. Nonetheless, when, principly for reasons of economy, it is desirable to employ only a single laser beam, such a system is constructed using the mechanism shown in FIG. 18. In particular, beam splitter 85 divides the light from a laser source into two beams, one of which is directed to a proximal side of the rotating medium through shutter 86 and the other of which is directed to the distal side of medium 30 through shutter 87. In general, when shutter 86 is open, shutter 87 is closed and when shutter 87 is opened, shutter 86 is closed. This provides isolation for the reading and writing of information from and to the medium. Nonetheless, it is necessary to employ a mechanism for redirecting light from one side of the disk, around its edge, to the other side. This mechanism is provided by moveable frame 114 which supports mirrors 111, 112 and 113 as shown. (Additionally, in alternate embodiments, a fiber optic cable in a moveable mount is provided as a mechanism for redirecting laser light from one side of medium 30 to the other side.)

Figure 19:
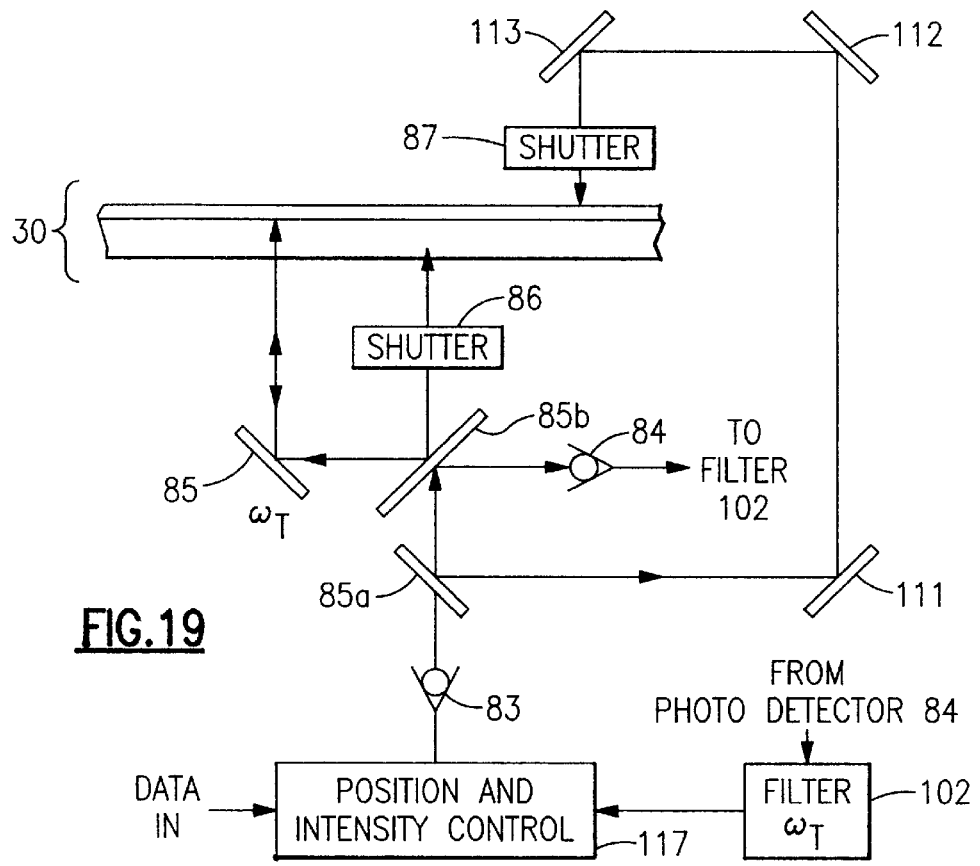
FIG. 19 is an optical path diagram more particularly illustrating overall optical system for reading and writing information to both sides of a information storage blank.

Attention is next directed to FIG. 19. FIG. 19 illustrates the mechanism of FIG. 18 in the more complete context of an information writing system employed in conjunction with other aspects of the present invention. In particular, it is seen that, when the beam is split by means of beam splitters 85*a* and 85*b*, as shown in FIG. 19, it is necessary to employ shutters 86 and 87 positioned as shown. The system shown in FIG. 19 is particularly desirable for precise control of writing information onto medium 30. In particular, it is seen that shutters 86 and 87 do not interfere with the return of a tracking signal to photodetector 84 which is provided to $\omega_T$ filter 102 as shown. Additionally, for reasons of simplicity, clarity and ease of understanding, function block 117 essentially incorporates the two functions of position and intensity control as is more specifically illustrated in FIG. 15 as function blocks 81 and 91, respectively. Accordingly, FIG. 19 represents the incorporation of the mechanism shown in FIG. 18 in an apparatus used primarily for writing information onto storage medium 30.

Figure 20:
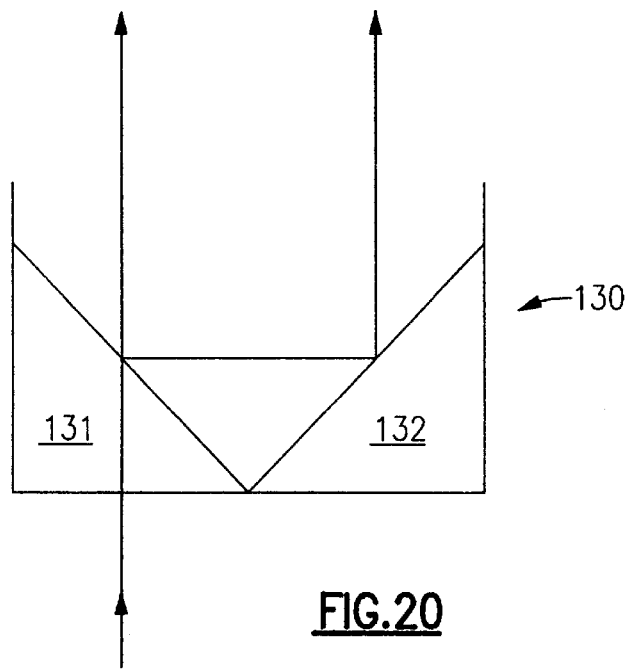
FIG. 20 is a side elevation view of a read/write head which may be employed in conjunction with the system in the present invention.
Figure 21:
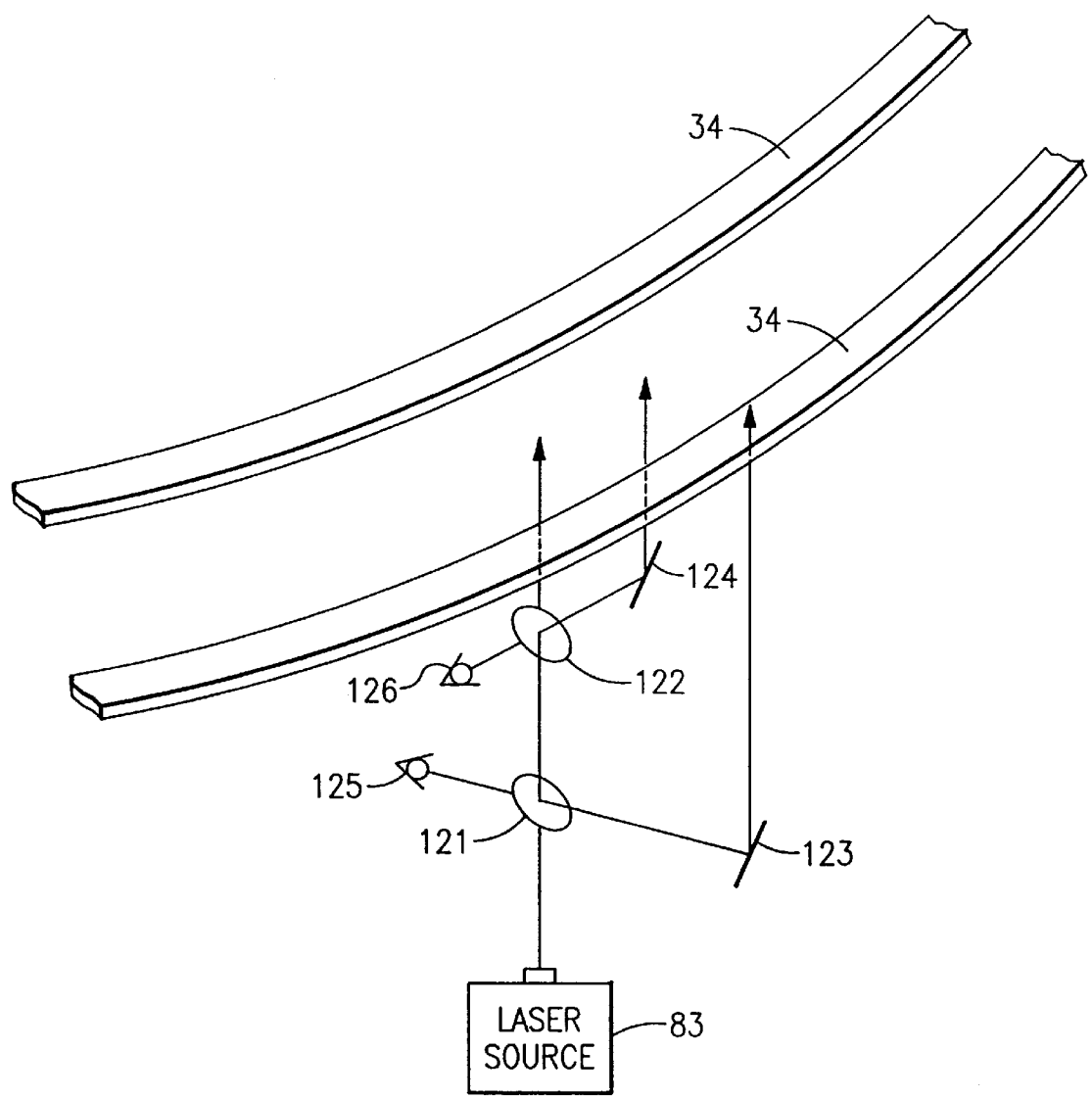
FIG. 21 is a partially isometric and partially functional block diagram illustrating a system in accordance with present invention in which an immediate read-after-write operation is performed.

In some embodiments of the present invention and, in particular, in situations similar to that shown in FIG. 21, it is sometimes desirable to produce two parallel beams of laser light. Apparatus 130 shown in FIG. 20 achieves this purpose by providing the effects of two prisms 131 and 132 disposed with respect to one another as shown in FIG. 20. This mechanism provides another means for splitting an input light signal into two separate signals which are meant to travel on essentially parallel paths.

The embodiment of the present invention shown in FIG. 21 is particularly directed to a system and method which permits simultaneous reading and writing of information. For a proper understanding of this aspect of the present invention, it is important to appreciate that, while partially functional, the illustration shown in FIG. 21 is also in part a three-dimensional isometric view which should be read and interpreted with that perspective in mind. Accordingly, it is seen that the system in FIG. 21 includes laser light source 83 which directs a thin laser beam to beam splitter 121 which is positioned and angled to direct part of the beam, namely, the tracking or reference beam, to reflective means 123 which, in turn, directs the tracking beam to an edge of reference track 34. Motion of reflective means 123 produces dithering as described above. It is the reflection of this reference beam back to reflective means 123 and through beam splitter 121 to photodetector 125 which permits the generation of an appropriate tracking signal. In short, the signal S×I is produced by photodetector 125.

However, it is important to note that, in addition to the usual tracking function, the system shown in FIG. 21 performs a read-after-write operation. This is accomplished through the use of a second beam splitter 122 which is angled and positioned so as to direct the beam from laser source 83 directly onto a spot within recording medium 30 to be written into or onto. In FIG. 21, it is seen that such a beam extends directly upward from beam splitter 122. At the same time, a relatively small portion of this beam is directed to reflective means 124 which provides a light beam signal for reading information which has just been written to the disk or which may have been written to the disk at an earlier time. This information modulates the light reflected from the disk and the reflected light is directed by reflective means 124 back to angled and positioned beam splitter 122 to photodetector 126 which provides, not the S×I signal, but instead, the information signal. As in previous embodiments, reflective means 123 is dithered at an appropriate frequency $\omega_T$ for tracking purposes.

Reading after writing provides significant advantages to the system. In particular, when it is known what bit pattern is being written to the disk, it is immediately therefore possible to determine that, in fact, that bit pattern has been indeed actually written to the disk. More particularly, in those situations employing error correction coding, error detection circuitry is used to analyze to the electrical signal from photodetector 126 to immediately determine that an error in information storage has occurred.

With particular reference to the present system, the fact that one thereafter knows that a particular position on a disk has been incorrectly written makes it possible to create directories and subdirectories of information which is stored on the disk itself (or elsewhere) which specifically indicates bad tracks and track "sector" positions. This is particularly true in the present invention since the accuracy of position determination renders it possible to store the location of each and every bit on the disk so that, in effect, the disk becomes completely addressable almost in the random access memory sense of the word although not quite as fast.

Figure 22:
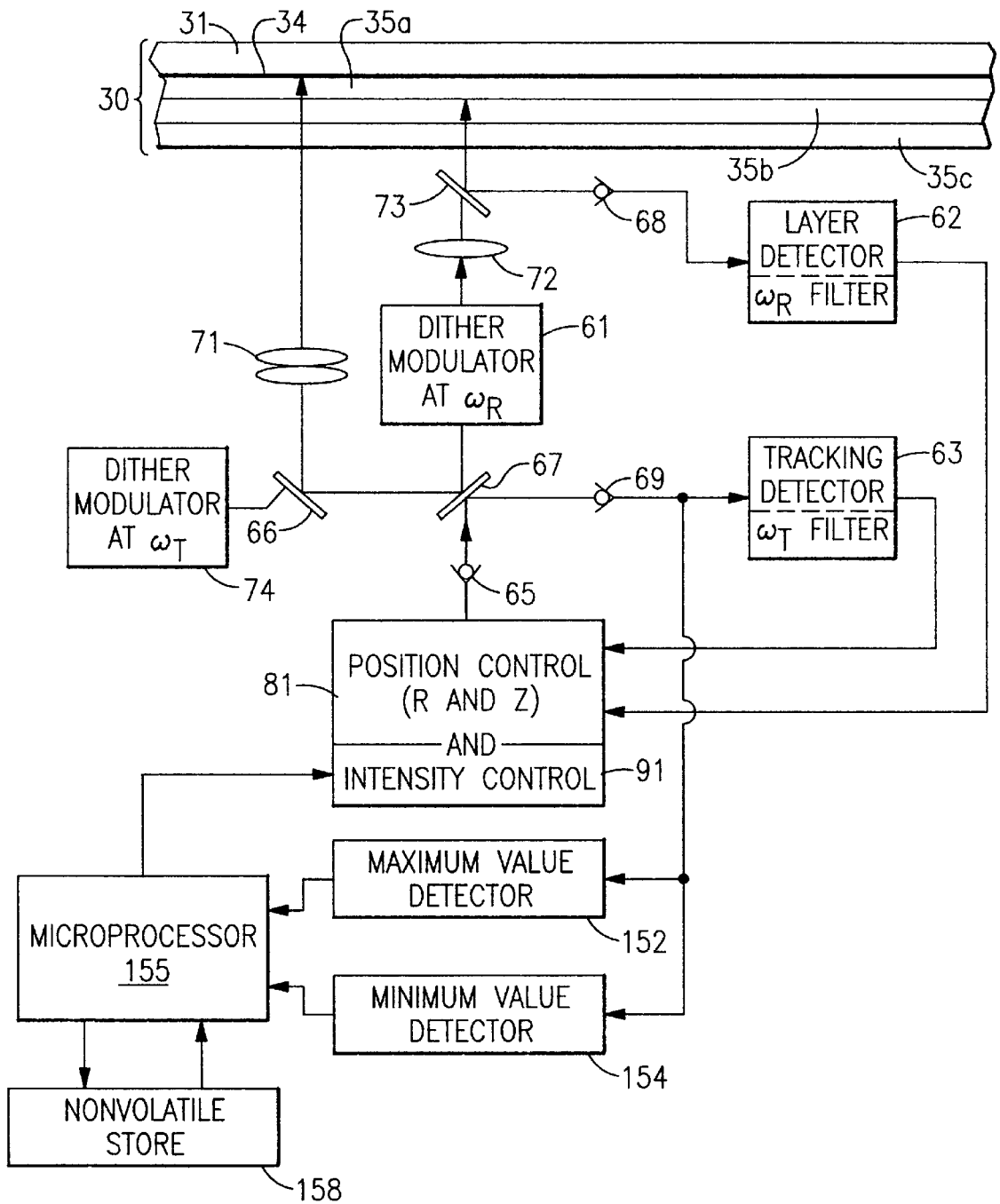
FIG. 22 is a functional block diagram illustrating a system in accordance with the present invention which is similar to the system shown in FIG. 10 but more particularly illustrating the monitoring functions which may be provided relative to the laser aging process.

The embodiment of the present invention shown in FIG. 22 is similar to the systems shown in FIGS. 10 and 15, discussed above, but which more particularly includes circuits for performance monitoring. This monitoring is possible because of the return reflection of the tracking beam from tracking layer 34 through lens system 71 to mirror means 66 to beam splitter 67 and finally to photodetector 69. The existence of this signal provides a mechanism for monitoring the performance of laser 65. In particular, it is noted that the system shown in FIG. 22 is particularly adapted for the writing of information to medium 30. This is particularly relevant since the question of the aging of laser source 65 is more relevant to the writing of information than it is to the reading of information from a disk.

One would like to be able to measure the performance of laser source 65 over a relatively long period of time to determine whether or not the laser should be replaced (or the drive current adjusted. As discussed above, with time, the power-current curve shown in FIG. 16 shifts to the right. If the same level of drive current is supplied to semiconductor laser source 65, then the power output is diminished and, correspondingly, the voltage appearing as an output of photodetector 69 decreases. The aging of laser source 65 can, thus, at least be partially compensated by an increase in the drive current to a more satisfactory value. The signal S×I appearing as the output of photodetector 69 provides an opportunity for measuring a signal which is indicative of this aging process. There are several different ways to determine, control and compensate for this phenomenon. For example, if the maximum value of the output signal from photodetector 69 drops below a predetermined threshold, then microprocessor 155, receiving such a signal from maximum value detector 152, is programmed to increase the level of current supplied by current intensity control unit 91. Similar controls are effected if the minimum value, as supplied by minimum value detector 154, falls below a predetermined threshold. Microprocessor 155 is programmed to permit the selection of either one (or both) of these two criteria as a mechanism for increasing (or even decreasing) semiconductor laser current.

Figure 26:
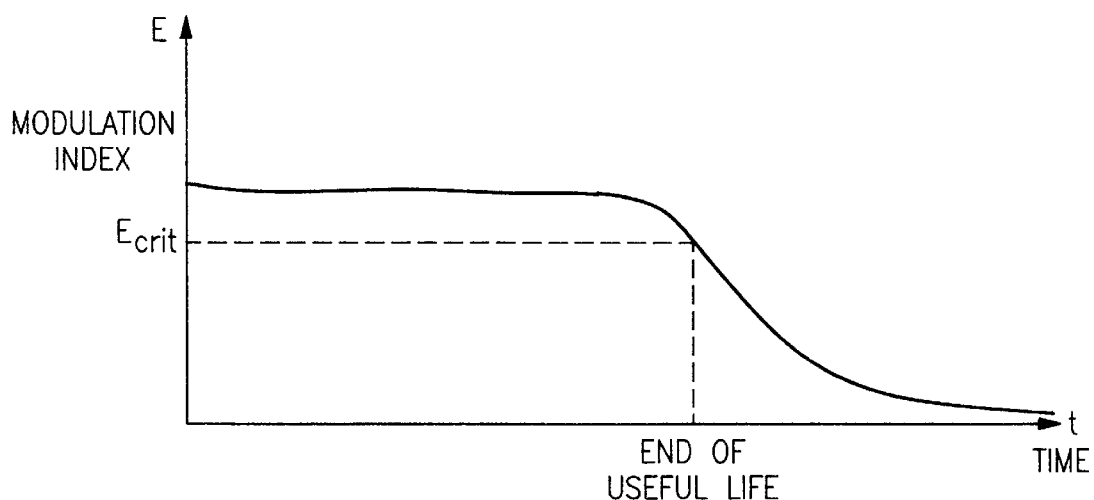
FIG. 26 is a plot which is representative of the modulation index for a semiconductor laser device as a function of time.

However, a more realistic appraisal of the laser-aging process over a period of time is specifiable by a modulation index E which is defined as $(V_{max}-V_{min})/(V_{max}+V_{min})$. If this value of E as thus defined drops below a predetermined threshold value, then it can be concluded that laser 65 has in fact aged to a point which merits replacement or which will merit replacement in a relatively short, predictable period of time. A typical plot of modulation index E as a function of time which is typical for semiconductor lasers is illustrated in FIG. 26. This curve suggests that at a point in time when the value of E drops below a critical value, $E_{crit}$, then the laser device should be replaced. In the event that laser source 65 comprises a plurality or array of semiconductor laser diode devices, then the passage of E to a value below $E_{crit}$ is also usable to provide a signal that a different laser source in the array should be used.

The circuits that effectuate this measurement control and determination are shown in FIG. 22. In particular, maximum value detector 152 and minimum value detector 154 determine maximum and minimum values for the signal S×I over a relatively short period of time ranging from approximately tens of microseconds to about hundreds of microseconds. These detectors provide a representation of this maximum value to microprocessor 155 which stores these values in (preferably non-volatile) storage 158. Clearly, a non-volatile store 158 is preferred since, over a relatively long period of time, say 100,000 hours, the storage device in which the present invention is present may be turned on and off so that, over that period of time, power is not present at all times for memory preservation purposes. Furthermore, the long term storage of these values provide microprocessor 155 with the ability to compute a history of aging and performance-related data for each laser source. Microprocessor 155 is therefore also usable to control the level of semiconductor laser drive current in unit 91 as a means for, at least initially, compensating for decreased laser performance.

Figure 27A:
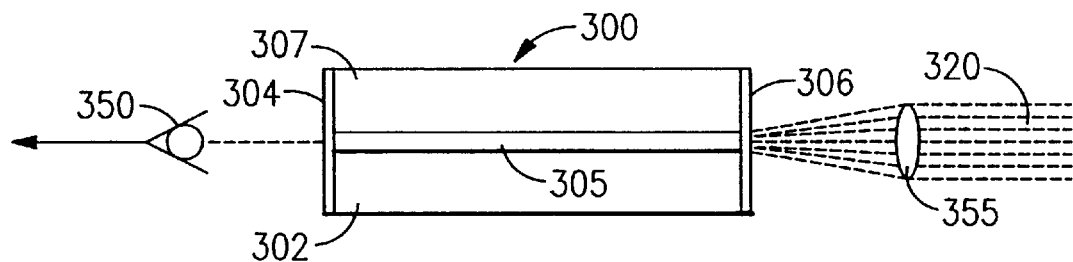
FIG. 27A is a side elevational view illustrating the operation of an edge-emitting laser diode device particularly showing light output monitoring device at the rear of the cell.
Figure 27B:
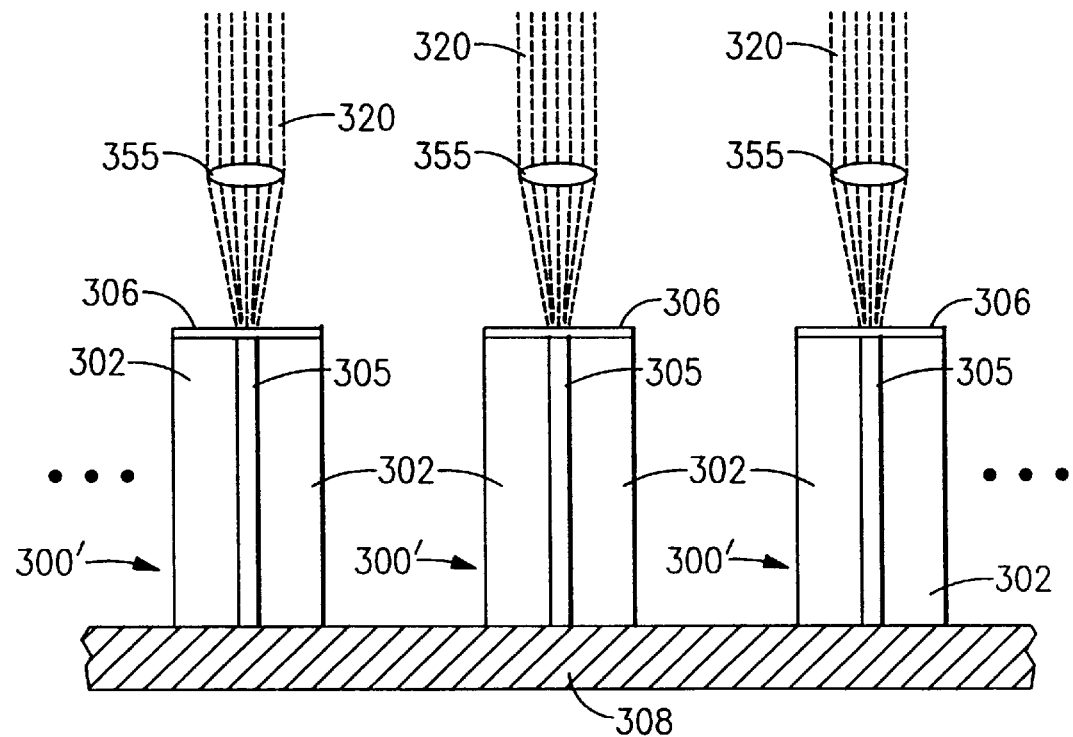
FIG. 27B is a side elevation view of three vertical channel semiconductor emitting lasers arranged in an array.

The system shown in FIG. 22 has a number of advantages. A significant advantage is the ability of the system to predict the imminent arrival of the end of life of the laser device (or one of them in the case of an array). This occurs as the value of E decreases along the "knee" of the curve shown in FIG. 26. However, a much more important utilization of the signal S×I comes from the fact that a form of laser diode that, in the so-called "VCSEL" device (Vertical Channel Semiconductor Emitting Laser 300' in FIG. 27B). These devices are to be contrasted with edge-emitting laser diodes, 300 in FIG. 27A. These two different kinds of laser devices (300 and 300') are illustrated in FIGS. 27A and 27B. In both of these figures, laser light leaving partially silvered mirror 306 is focused by lens 355 to form a focused beam 320 of usable laser light. However, the most important thing of note is that in an edge-emitting laser diode 300, as shown in FIG. 27A, it is possible, because some light escapes from partially mirrored surface 304 at the rear of the device, to provide a separate monitoring photodetector such as detector 350 shown in FIG. 27A. Since there is an escape of light from the rear, albeit small, it is nonetheless possible to monitor the performance of the laser over a period of time. However, in the construction of vertical channel semiconductor emitting lasers as shown in FIG. 27B, it is seen that the fabrication of these devices on a common substrate precludes access to the rear of such devices. In such devices, all light is emitted from lasing channel 305 contained in semiconductor body 302 and exits through partially transmissive mirror 306. Accordingly, for such devices, the utilization of the signal S×I, in the manner illustrated in applicants' FIG. 22 and in the manner discussed above with reference to FIG. 22, becomes that much more important for performance monitoring over a period of time.

The utilization of VCSELs offers challenges which the present invention solves. Accordingly, the present invention makes VCSELs that much more desirable. In particular, because VCSELs tend to be more temperature sensitive than edge-emitting diodes, it is possible, using the present invention, to more closely control the value of the current drive. In particular it is more readily possible now to control the current so that it operates at a low threshold current level.

For VCSELs, this current level is approximately 1 ma. in contrast to levels of 20–30 ma. which are required for edge-emitting devices. Additionally, low threshold VCSELs tend to be temperature sensitive which means that the amount of output power produced by these devices can vary. Accordingly, mechanisms which provide for constancy of this power in terms of a monitorable and measurable feedback loop can in fact produce stable conditions in otherwise potentially unstable devices. Accordingly, the performance monitoring in terms of maximum and minimum output values is particularly useful and desirable when the laser source being used is a VCSEL. Accordingly, the feedback mechanism of the present invention, in particular microprocessor 155, is used to control the value of E. This is important not only for VCSELs but also for the presently more common edge-emitting laser diode.

Figure 23A:
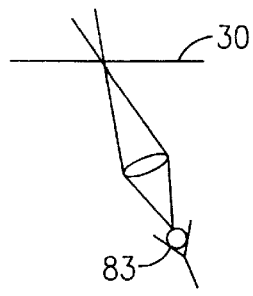
FIGS. 23A–23C illustrate yet another position parameter which may be controlled through the utilization of aspects of the present invention.
Figure 23B:
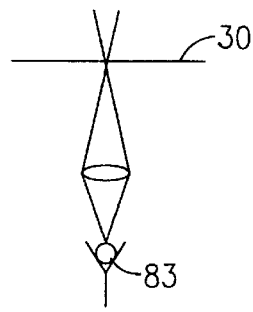
Figure 23C:
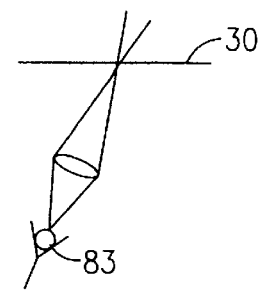

Another possible source of error and misalignment can exist in rotatable storage media in which laser light sources are employed either for reading or for writing information. In particular, there can be an angular misalignment between the laser light source and the surface of the rotating medium. Three variations of alignment are shown in FIGS. 23A, 23B and 23C. In particular, it is noted that FIG. 23B illustrates a case of ideal alignment with respect to the angle at which the laser light impinges upon the rotating medium.

Figure 24A:
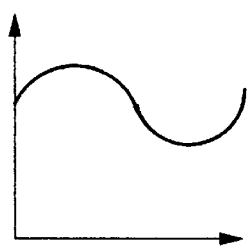
FIGS. 24A–24C illustrate output signal waveforms produced in the various configurations states shown in FIGS. 23A–23C, respectively.
Figure 24B:
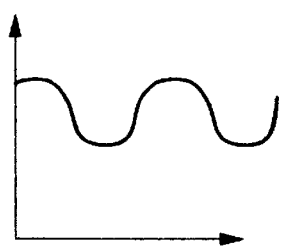
Figure 24C:
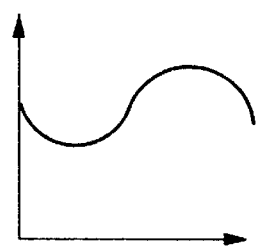

It is noted, however, that if the angle is off to the "left" as is shown (in exaggerated form) in FIG. 23A, an out of focus signal, such as that shown in FIG. 24A, is produced. In a similar vein, if the angular misalignment is to the "right," as shown in FIG. 23C, then the output from laser source/detector device 83 is shown in FIG. 24C. ("Left" and "right" are used here as relative terms which refer to a view seen by a fixed observer.) These signals are similar to those produced for edge tracking, as seen in FIGS. 9A and 9B above. As above, the same circuits are employed for detecting these signal waveforms to identify the existence and degree of angular misalignment. This misalignment is typically caused by wear in drive motor bearings, distortions in the lens systems or warping in the disk itself. Nonetheless, in an ideal situation, access of the rotating disk should be essentially parallel with the optical access of the laser system which produces the impinging radiation for reading or writing. Accordingly, a system such as that discussed above can be employed for determining this vertical misalignment.

Figure 25:
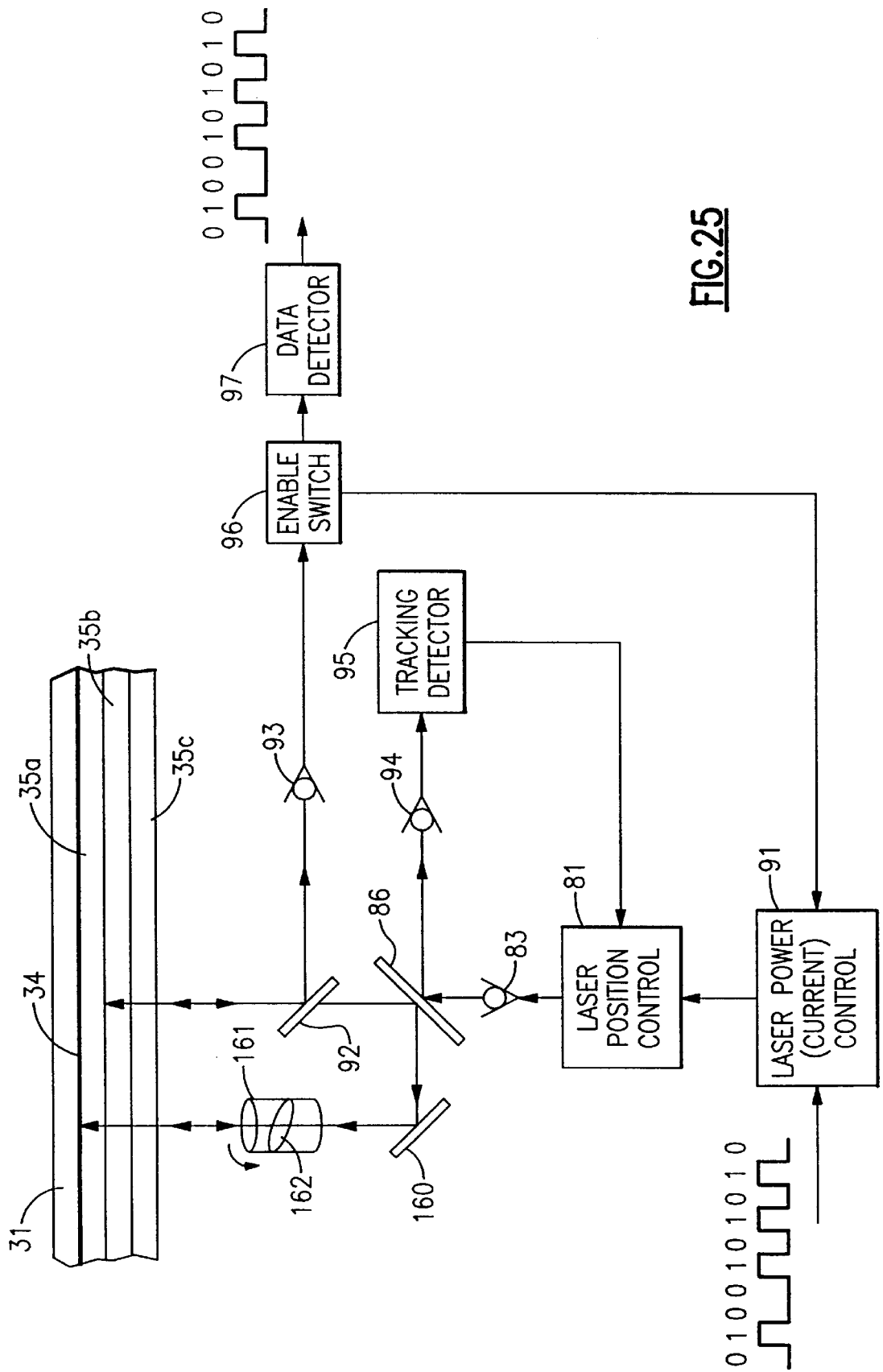
FIG. 25 illustrates a system in accordance with the present invention which is similar to FIG. 15 but yet particularly illustrates a mechanism which may be employed to induce the desired variation shown in FIGS. 23A–23C.

In order to achieve this objective, it is desirable to employ a lens system which provides, for tracking purposes, a variation in angular alignment as is suggested in FIGS. 23A–23C. In accordance with one of the embodiments of the present invention, this variability can be produced by disposing a lens, such as lens 162 in FIG. 25, within rotatable cylinder 161 so that it is canted at a slight angle with respect to the cylindrical access which also serves as an access of rotation for the entire cylinder/lens system. It is noted that, while FIG. 25 illustrates the use of a cylinder, any sufficiently rigid frame may be employed. The only requirements are that it should be capable of being rotated and also capable of holding lens 162 in a canted position. Such a system is well suited for determining angular misalignment.

Monitoring of the signal S×I also provides other possible advantages in information storage systems as contemplated herein. In particular, systems employing laser light for reading and writing purposes can suffer degradation over time in the intensity of output produced by the laser. This is particularly true for semiconducting lasing devices.

In an edge-emitting laser device such as shown in FIG. 27A, it is possible to employ photodetector 350 disposed behind rear, partially reflecting surface 304. This provides a mechanism for direct monitoring of light strength signals. However, in more recently developed vertical-cavity-surface-emitting lasers (VCSELs) such as are shown in FIG. 27B, it is not possible to employ photodetectors to monitor light being emitted from a rear wall of the lasing device. In VCSELs, such light is blocked by underlying semiconductor body 308. Therefore, a different mechanism is needed for monitoring performance and aging characteristics associated with VCSELs employed as sources of laser light.

Fortunately, it is possible to monitor a quantity referred to as the modulation index to determine proximity to end of life for semiconductor laser devices. A plot of modulation index as a function of time is shown for a typical semiconductor laser device in FIG. 26. When the modulation index approaches a reduced value $E_{crit}$, it is seen that the end of the useful life of the laser device is approaching. In general, this modulation index E is defined as the ratio between two quantities. The denominator of the ratio is the sum of the maximum and minimum values of the voltage produced by the photodetector which measures the S×I signal. The numerator of the modulation index determining the ratio is the difference between the maximum value of this voltage and the minimum value of this voltage. Accordingly, if the output of the photodetector is measured in terms of a voltage, the modulation index is $E=(V_{max}-V_{min})/(V_{max}+V_{min})$ In accordance with one embodiment of the present invention, the modulation index E is monitored over a period of time. When the value of E falls below a critical value, $E_{crit}$, such as that illustrated in FIG. 26, a warning is provided, or alternatively or in conjunction therewith, power in increased to the laser device to correct for the aging characteristics. This is therefore seen to prolong the life of the system. It is also seen to obviate the need for service in which it is necessary to replace one or more of the lasing devices employed.

In systems in accord with the present invention, lasing devices are typically the edge-emitting semiconductor laser devices as shown in FIG. 27A or the vertical cavity devices shown in FIG. 27B. For example, in edge-emitting semiconductor laser device 300, semiconductor material body 302 is provided with doped layer of lasing material 305 which defines the cavity in which the lasing action occurs. Partially reflecting surfaces 304 and 306 are provided at each end. As discussed above, monitoring photodetector 350 may be employed at the rear of the laser source behind rear, partially silvered reflector 304. However, the relative reflectivity of surfaces 304 and 306 are provided in a manner in which laser radiation 320 emanates through surface 306 and is focused by lens 355. Electrical contacts to the lasers are made in accordance with well-known industry practices.

In other embodiments of the present invention, it is desirable to employ vertical cavity semiconductor laser devices such as those illustrated in FIG. 27B. These devices have the advantage that they are more readily manufacturable and, in particular, are manufacturable so as to be disposed in either a linear or rectangular array lasing elements. The principle difference between the structures shown in FIG. 27A and FIG. 27B is that the latter lasing devices 300' are oriented vertically and are fabricated on opaque substrate 308. As described above, it is the presence of this substrate which precludes monitoring of the lasing action from behind over time by a detector, such as detector 350 shown in FIG. 27A.

The system of the present invention also has other advantages and usages growing out of the great accuracy with which the information track position is determinable. In particular, the system provides a mechanism for monitoring not only the performance of the laser devices themselves, but is also capable of monitoring the performance of the drive motor employed to rotate recordable medium 30. In addition, the system of the present invention also enables the creation of recordable media which have recorded thereon indications of the precise speed at which the information was written to the disk.

Figure 28:
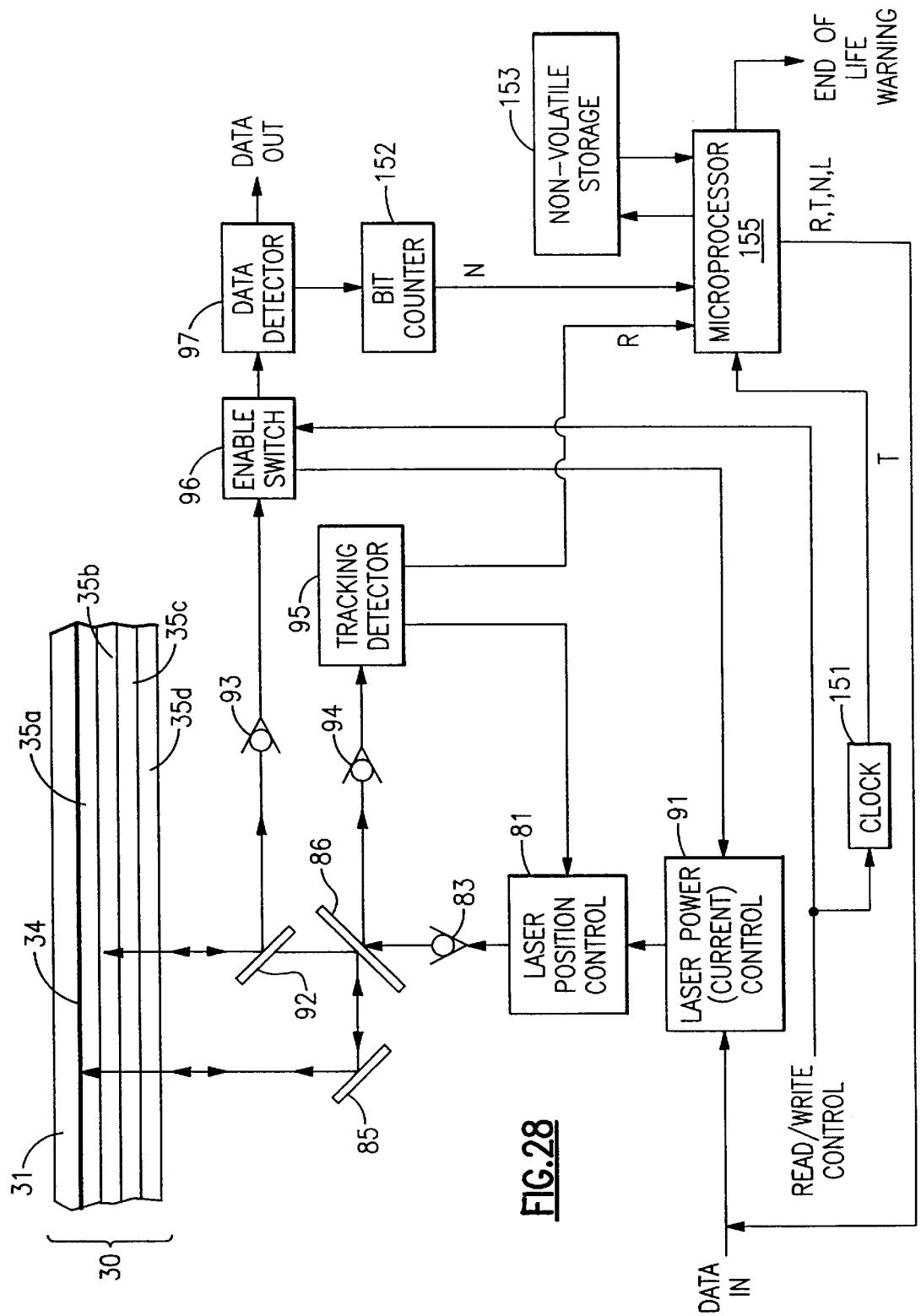
FIG. 28 is a view similar to FIG. 15 but more particularly illustrating apparatus elements for determining rotation velocity, particularly angular velocity, and for thus creating a recording machine having information thereon indicative of physical speed, format, timing and spacing parameters.

Some of the latter aspects of the invention are illustrated in FIG. 28 which is similar to FIG. 15 which has already been described above. However, certain additional components are provided in this more advanced system for the purposes of achieving objectives described more immediately above. In particular, during a read or write control operation, clock 151 is started or stopped as a mechanism for providing an indication of writing time or reading time T to microprocessor 155. Additionally, a very accurate value for the position R of the track in a radial direction is also provided to microprocessor 155. As data is read out from the disk, bit counter 152 provides microprocessor 155 with a count N of the number of bits which have been read. This counter can be reset as necessary under control of microprocessor 155. Microprocessor 155 is also coupled to non-volatile store 153 for the purpose of storing values of R, T and N as these values are sampled over a period of time. Non-volatile store 153 may also include values of L which represents the physical distance between bits written to the disk.

Figure 29:
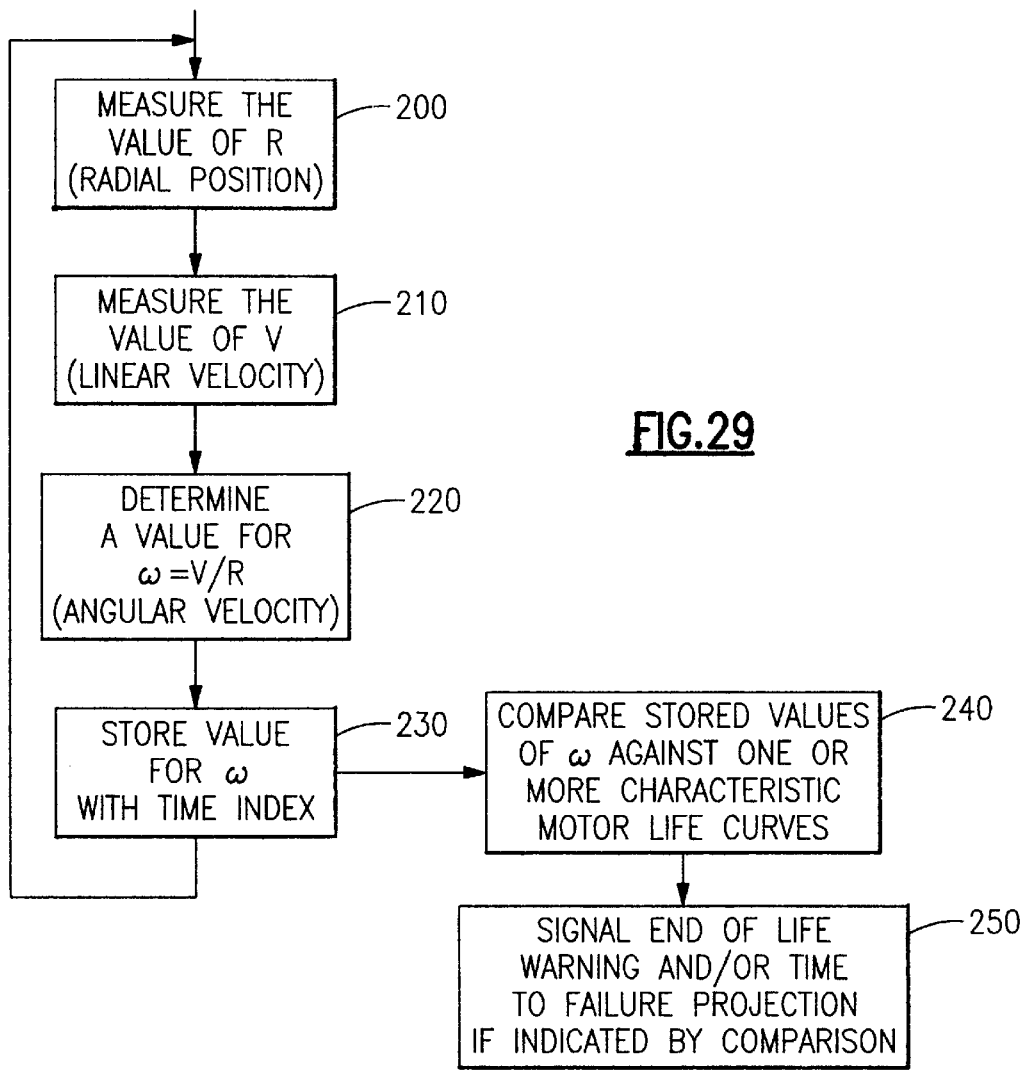
FIG. 29 is a flow chart illustrating the steps in a method for determining angular velocity, particularly angular velocity, over a period of time to determine drive motor aging characteristics.

A process of carrying out these determinations and computations is illustrated in FIG. 29. In particular, the process begins with the measurement of the value of R, the radial position for a selected information track (Step 200). At the same time, a value for the linear velocity V is also determined from values N, L and T since it is known that the linear velocity is in fact proportional to the ratio NL/T (Step 210). Next, a value is determined for the angular velocity $\omega$ which is equal to the linear velocity V divided by radius R (Step 220). These values of R, V and o are stored in non-volatile storage or even written to disk 30 together with a time indicator. Next, stored values of $\omega$ are compared against one or more characteristic motor life curves (Step 240). If the comparison is unsatisfactory, then an end-of-life motor drive warning is provided and/or a time-to-failure projection is indicated. Additionally, it is noted that, even without comparison to stored motor life characteristics, stored values for $\omega$ may be analyzed by themselves to determine if the variability in $\omega$ is greater than desirable for information storage systems having certain capacity and/or data transfer rates. End-of-life warning signals may be provided, for example, if the value of X has dropped by a certain percentage of its original value or if it has dropped below a value which is acceptable for a drive motor having an age which is indicated by the time index (clock value) which is stored with the sample values of $\omega$.

Clearly, if the information with respect to motor drive life is written to disk 30 instead of to a non-volatile storage unit, then, it is necessary that this same disk be employed in the storage system when motor life characteristics are being determined. Accordingly, such systems may be provided with special disks used to maintain service and maintenance information. Accordingly, the present invention includes special diagnostic disks which are usable with one or more drive units to perform maintenance monitoring and diagnostic functioning.

Figure 30:
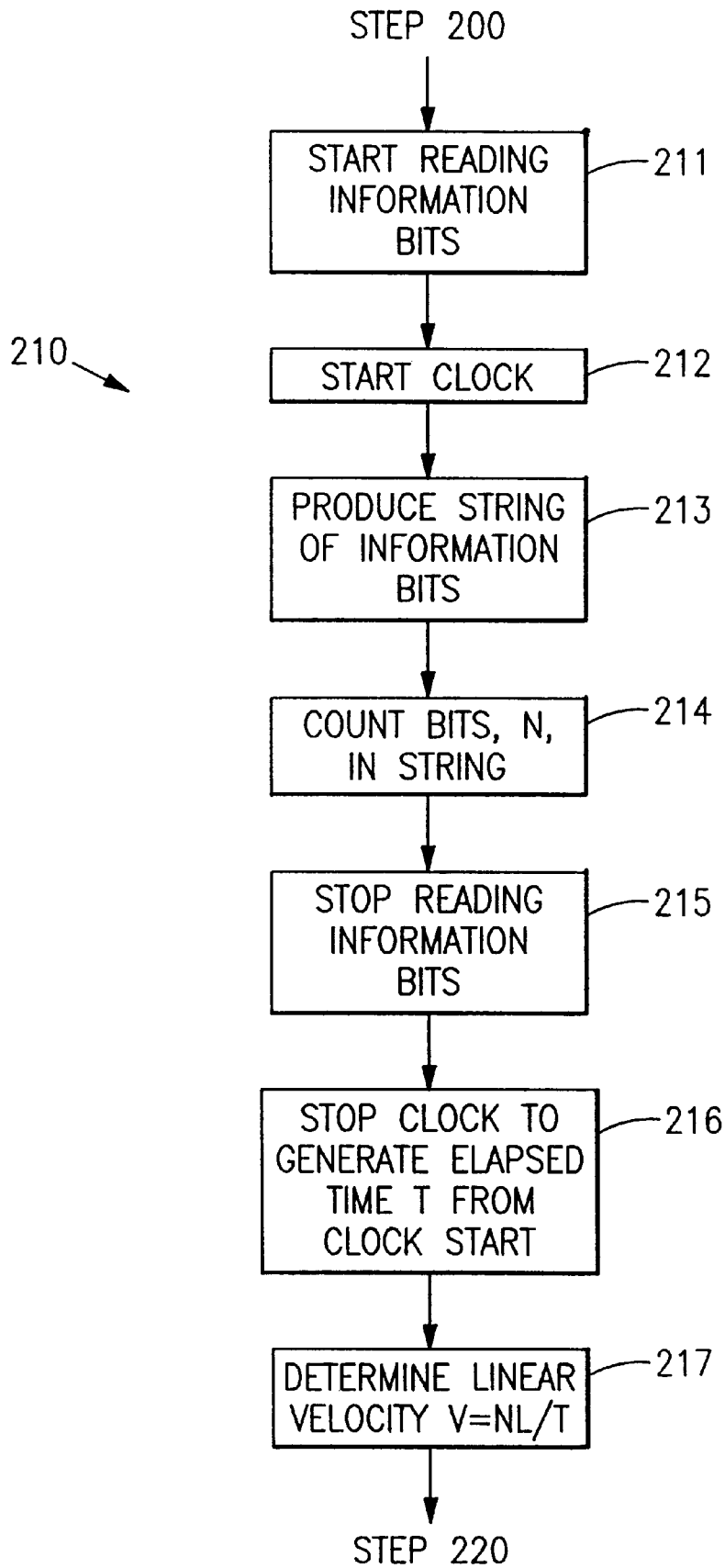
FIG. 30 is a flow chart illustrating in detail the step shown in FIG. 29 relating to measuring linear velocity.

The determination of linear velocity as described above in Step 210 is more particularly illustrated in FIG. 30. In particular, the process of determining linear velocity V begins by reading information bits from medium 30 (Step 211). Once the reading of information bits is begun, a clock (such as clock 151) is started (Step 212). During reading operations, strings of information bits are produced (Step 213). These bits are counted, as for example by bit counter 152, to produce an integer N indicating the number of bits in the string or stream (Step 214). At a convenient point in time, the reading of the information bits is stopped (Step 215), at which time the clock is also stopped to generate an elapsed time (Step 216) that has been required to read these N bits. From the values of N and T and a previously known and stored value of L, the linear velocity V is determined as at least being proportional to NL/T (Step 217).

Figure 31:
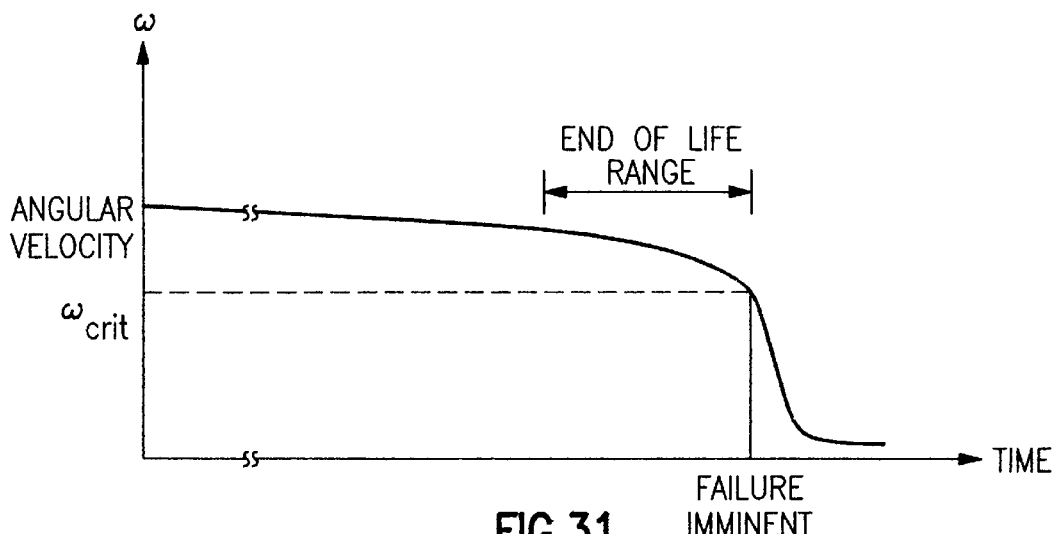
FIG. 31 is a graph illustrating typical angular velocity measurements as a function of time for comparison to provide drive motor performance and aging indications.

As indicated above with respect to Step 240, stored values of $\omega = V/R$ versus time may be compared with one or more previously known and/or determined motor life characteristics. Such a characteristic is illustrated in FIG. 31 which shows the typical variation in angular velocity as a function of time. As with the laser light output as discussed above, once the value of angular velocity drops below the critical value, wcrit, there is provided an excellent indication that motor failure is imminent or that the motor is sufficiently aged so as to preclude its further utilization. In situations where one is writing information to disk which is permanently stored thereon, it is important to be able to determine that the writing system, namely, the motor drive and the laser drive mechanisms, are operating in a fashion which does not write useless and/or unretrievable information to the disk. This could render the disk medium incapable of being read from or written to by other drive mechanisms into which it is inserted.

The mechanism of the present invention is also employed to detect wobble in the drive and spindle mechanism. In particular, at any given radial position, a wobbling motion will produce a variation in focus in the Z direction as a function of the angular position of the disk. Clearly, the determination of wobble is more sensitive at the outer tracks on the medium. Nonetheless, at virtually any radial position, variability of the focus of the laser light in the Z direction provides an indication that wobbling motion is occurring. With particular respect to the present invention, the ability to determine accurately values of R makes it very easy to determine whether or not the degree of focus variation provides an indication that the wobble is beyond acceptable limits. For example, a given indication of wobble magnitude should be considered in light of the radial position at which it is measured since it is known that focus variation is more sensitive at outer radial positions (higher values of R). Thus, the system of the present invention is also applicable to wobble monitoring.

Next is considered the application of the present invention in systems and methods for position determination in the angular ($\theta$) direction together with methods for determining performance of the system in terms of potential wobble. As above, all of these operations take full advantage of characteristics and improved accuracy associated with the signal S×I.

Wobble is determined by measuring the height Z of the focal plane at a small value of the radius R and by measuring it again at a larger value of R. The difference between these two measured focal plane heights is a measure of wobble. If it exceeds a predetermined value, there is thus an indication that there is a drive motor or drive mechanism problem for which an appropriate signal is generated.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for writing information on a laser writable recording disk which has at least one set of substantially parallel light reflective tracks thereon, said method comprising the steps of:

rotating said disk;

directing a first laser beam against said reflective track;

moving only said first laser beam in an oscillatory manner back and forth across an edge of one of said reflective tracks;

directing laser radiation from said first beam which has been reflected from said at least one track to a photodetector which converts reflected light into corresponding electrical signals;

determining from said electrical signals the position of said first beam with respect to said track;

positioning a second laser beam, which is at a fixed distance from said first beam, so that said second beam is directed to a selectable one of several radial positions, on said writable disk, between adjacent ones of said reflective tracks; and controlling power in said second laser beam so as to write information onto said recording disk.

2. The method of claim 1 in which said first and second beams have the same source.

3. The method of claim 1 in which said tracks form a spiral pattern.

4. The method of claim 1 in which said tracks form concentric circles.

5. The method of claim 1 in which said tracks are aluminum.

6. The method of claim 1 in which said positioning and said controlling are repeated so as to write information onto said disk in a plurality of information tracks between adjacent portions of said reflective tracks.

* * * * *